(12) United States Patent
Suzuki

(10) Patent No.: US 11,671,813 B2
(45) Date of Patent: *Jun. 6, 2023

(54) FUNCTION EXECUTION DEVICE AND COMMUNICATION TERMINAL

(71) Applicant: Brother Kogyo Kabushiki Kaisha, Nagoya (JP)

(72) Inventor: Satoshi Suzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/590,272

(22) Filed: Feb. 1, 2022

(65) Prior Publication Data
US 2022/0159439 A1     May 19, 2022

Related U.S. Application Data

(60) Continuation of application No. 17/469,570, filed on Sep. 8, 2021, which is a continuation of application (Continued)

(30) Foreign Application Priority Data

May 30, 2014    (JP) ................................ 2014-113107

(51) Int. Cl.
*H04L 9/40* (2022.01)
*H04W 4/80* (2018.01)
(Continued)

(52) U.S. Cl.
CPC .............. *H04W 4/80* (2018.02); *G06F 21/43* (2013.01); *H04L 63/08* (2013.01); *H04L 63/101* (2013.01);
(Continued)

(58) Field of Classification Search
CPC ........ G06F 21/00; G06F 21/30; G06F 21/305; G06F 21/31; G06F 21/42–43;
(Continued)

(56) References Cited

U.S. PATENT DOCUMENTS 7,209,706 B2    4/2007  Fujii et al.
7,346,061 B2    3/2008  Takayama et al.
(Continued)

FOREIGN PATENT DOCUMENTS

CN    101253469 A    8/2008
CN    101790183 A    7/2010
(Continued)

OTHER PUBLICATIONS

Jul. 7, 2010—NFC Forum Connection Handover Technical Specification 1.2.
(Continued)

*Primary Examiner* — Eric W Shepperd
(74) *Attorney, Agent, or Firm* — Banner & Witcoff, Ltd.

(57) ABSTRACT

A system and method for providing an authentication state of a function execution device to a communication terminal is described. In some examples, the authentication state indicates whether authentication information is needed from the communication terminal before the communication terminal can request performance of one or more functions performable by the function execution device. In other examples, the communication terminal may provide to the communication terminal the authentication information irrespective of whether the function execution terminal has previously provided its authentication state to the communication terminal.

5 Claims, 10 Drawing Sheets

Related U.S. Application Data

No. 16/720,120, filed on Dec. 19, 2019, now Pat. No. 11,140,535, which is a continuation of application No. 15/904,973, filed on Feb. 26, 2018, now Pat. No. 10,542,403, which is a division of application No. 14/669,553, filed on Mar. 26, 2015, now Pat. No. 10,278,045.

(51) Int. Cl.
| | |
|---|---|
| *H04L 67/10* | (2022.01) |
| *G06F 21/43* | (2013.01) |
| *H04W 12/06* | (2021.01) |
| *H04W 12/08* | (2021.01) |
| *H04W 12/50* | (2021.01) |
| *H04W 84/12* | (2009.01) |
| *H04W 88/06* | (2009.01) |

(52) U.S. Cl.
CPC ............ *H04L 67/10* (2013.01); *H04W 12/06* (2013.01); *H04W 12/08* (2013.01); *H04W 12/50* (2021.01); *H04W 84/12* (2013.01); *H04W 88/06* (2013.01)

(58) Field of Classification Search
CPC ............ G06F 2221/2141; H04L 63/08; H04L 63/0853; H04L 63/0876; H04L 63/10; H04L 63/101; H04W 12/06; H04W 12/08; H04W 4/008; H04W 84/12
See application file for complete search history.

(56) References Cited

U.S. PATENT DOCUMENTS

| | | | |
|---|---|---|---|
| 7,457,417 | B1 | 11/2008 | Mirza-Baig |
| 7,489,902 | B2 | 2/2009 | Amani et al. |
| 8,189,225 | B1 | 5/2012 | Lo et al. |
| 8,380,183 | B2 | 2/2013 | Misumi et al. |
| 9,274,738 | B2 | 3/2016 | Naruse |
| 9,542,138 | B2 | 1/2017 | Park |
| 10,275,695 | B2* | 4/2019 | Matsuda ............... G06F 3/1292 |
| 2003/0007606 | A1 | 1/2003 | Suder et al. |
| 2004/0116074 | A1 | 6/2004 | Fujii et al. |
| 2004/0123113 | A1 | 6/2004 | Mathiassen et al. |
| 2004/0192264 | A1 | 9/2004 | Liu et al. |
| 2004/0248514 | A1 | 12/2004 | Idani et al. |
| 2005/0077356 | A1 | 4/2005 | Takayama et al. |
| 2005/0088709 | A1 | 4/2005 | Kizaki et al. |
| 2005/0268104 | A1 | 12/2005 | Sugishita et al. |
| 2006/0026434 | A1 | 2/2006 | Yoshida et al. |
| 2006/0101280 | A1 | 5/2006 | Sakai |
| 2006/0126118 | A1 | 6/2006 | Nagata |
| 2006/0128360 | A1 | 6/2006 | Hibino |
| 2006/0245402 | A1 | 11/2006 | Fujii et al. |
| 2007/0051803 | A1 | 3/2007 | Tada et al. |
| 2007/0061573 | A1 | 3/2007 | Dokuni et al. |
| 2007/0156726 | A1 | 7/2007 | Levy |
| 2007/0190937 | A1 | 8/2007 | Takayama |
| 2007/0190939 | A1 | 8/2007 | Abel |
| 2007/0230332 | A1 | 10/2007 | Fukasawa |
| 2008/0046570 | A1 | 2/2008 | Abel |
| 2008/0052710 | A1 | 2/2008 | Iwai et al. |
| 2008/0080392 | A1 | 4/2008 | Walsh et al. |
| 2008/0084578 | A1 | 4/2008 | Walker et al. |
| 2008/0113655 | A1 | 5/2008 | Angelhag |
| 2008/0117847 | A1 | 5/2008 | Hamada |
| 2008/0218810 | A1 | 9/2008 | Itoh |
| 2008/0222711 | A1 | 9/2008 | Michaelis |
| 2008/0231900 | A1 | 9/2008 | Abe |
| 2008/0232405 | A1 | 9/2008 | Gallo |
| 2008/0252415 | A1 | 10/2008 | Larson et al. |
| 2008/0288958 | A1 | 11/2008 | Ryoo et al. |
| 2008/0299907 | A1 | 12/2008 | Takayama |
| 2009/0009299 | A1 | 1/2009 | Ikeda et al. |
| 2009/0021764 | A1 | 1/2009 | Kano |
| 2009/0023476 | A1 | 1/2009 | Saarisalo et al. |
| 2009/0024768 | A1 | 1/2009 | Maruyama et al. |
| 2009/0033972 | A1 | 2/2009 | Kato |
| 2009/0036056 | A1 | 2/2009 | Oshima et al. |
| 2009/0052348 | A1 | 2/2009 | Kato et al. |
| 2009/0066998 | A1 | 3/2009 | Kato |
| 2009/0073482 | A1 | 3/2009 | Tsuchiya |
| 2009/0103124 | A1 | 4/2009 | Kimura et al. |
| 2009/0147803 | A1 | 6/2009 | Takayama |
| 2009/0192912 | A1 | 7/2009 | Griffin et al. |
| 2009/0193500 | A1 | 7/2009 | Griffin et al. |
| 2009/0247077 | A1 | 10/2009 | Sklovsky et al. |
| 2009/0254908 | A1 | 10/2009 | Klave et al. |
| 2009/0271519 | A1 | 10/2009 | Helvick |
| 2009/0298426 | A1 | 12/2009 | Helvick |
| 2010/0050189 | A1 | 2/2010 | Sng |
| 2010/0058359 | A1 | 3/2010 | Ferlitsch |
| 2010/0069008 | A1 | 3/2010 | Oshima et al. |
| 2010/0077031 | A1 | 3/2010 | Yoneda et al. |
| 2010/0078471 | A1 | 4/2010 | Lin et al. |
| 2010/0078472 | A1 | 4/2010 | Lin et al. |
| 2010/0081385 | A1 | 4/2010 | Lin et al. |
| 2010/0082485 | A1 | 4/2010 | Lin et al. |
| 2010/0122319 | A1* | 5/2010 | Nakashima ........ H04N 1/00464 726/2 |
| 2010/0130127 | A1 | 5/2010 | Takayama |
| 2010/0151790 | A1 | 6/2010 | Hoeksel et al. |
| 2010/0186063 | A1 | 7/2010 | Oba et al. |
| 2010/0188695 | A1 | 7/2010 | Okigami |
| 2010/0207735 | A1 | 8/2010 | Kim |
| 2010/0207742 | A1 | 8/2010 | Buhot et al. |
| 2010/0221999 | A1 | 9/2010 | Braun et al. |
| 2010/0241857 | A1 | 9/2010 | Okude et al. |
| 2010/0311330 | A1 | 12/2010 | Aibara et al. |
| 2010/0318712 | A1 | 12/2010 | Boldyrev et al. |
| 2010/0330910 | A1 | 12/2010 | Yan et al. |
| 2011/0002005 | A1 | 1/2011 | Ashmore |
| 2011/0004755 | A1 | 1/2011 | Ueno |
| 2011/0026068 | A1 | 2/2011 | Yoshida |
| 2011/0028091 | A1 | 2/2011 | Higgins et al. |
| 2011/0035785 | A1* | 2/2011 | Mihara ............... G06F 21/84 726/2 |
| 2011/0040944 | A1 | 2/2011 | Yamauchi et al. |
| 2011/0055366 | A1* | 3/2011 | Okamura ............ G06F 21/629 709/223 |
| 2011/0065385 | A1 | 3/2011 | Geslin et al. |
| 2011/0075186 | A1 | 3/2011 | Azuma |
| 2011/0090830 | A1 | 4/2011 | Churei |
| 2011/0116125 | A1 | 5/2011 | Park |
| 2011/0177780 | A1 | 7/2011 | Sato et al. |
| 2011/0210618 | A1 | 9/2011 | Takasu |
| 2011/0226853 | A1 | 9/2011 | Soh et al. |
| 2011/0228311 | A1 | 9/2011 | Oguma et al. |
| 2011/0234013 | A1 | 9/2011 | Hatakeyama |
| 2011/0235085 | A1 | 9/2011 | Jazayeri et al. |
| 2011/0244849 | A1 | 10/2011 | Misumi et al. |
| 2011/0258322 | A1 | 10/2011 | Luzzatti et al. |
| 2011/0267636 | A1 | 11/2011 | Kamasuka |
| 2011/0275316 | A1 | 11/2011 | Suumaki et al. |
| 2011/0292445 | A1 | 12/2011 | Kato |
| 2012/0034868 | A1 | 2/2012 | Fine et al. |
| 2012/0069772 | A1 | 3/2012 | Byrne et al. |
| 2012/0099566 | A1 | 4/2012 | Laine et al. |
| 2012/0100803 | A1 | 4/2012 | Suumaki et al. |
| 2012/0101944 | A1 | 4/2012 | Lin et al. |
| 2012/0124365 | A1 | 5/2012 | Black et al. |
| 2012/0135681 | A1 | 5/2012 | Adams et al. |
| 2012/0166338 | A1 | 6/2012 | Agnelli et al. |
| 2012/0171952 | A1 | 7/2012 | Ohira et al. |
| 2012/0173318 | A1 | 7/2012 | Lee et al. |
| 2012/0194864 | A1 | 8/2012 | Oshima et al. |
| 2012/0208461 | A1 | 8/2012 | Choi et al. |
| 2012/0212325 | A1 | 8/2012 | Kanemoto |
| 2012/0252405 | A1 | 10/2012 | Lortz et al. |
| 2012/0297048 | A1 | 11/2012 | Hsu |
| 2012/0300245 | A1 | 11/2012 | Chatierjee et al. |
| 2012/0329390 | A1 | 12/2012 | Kim |
| 2012/0330784 | A1 | 12/2012 | Nahidipour |

(56) References Cited

U.S. PATENT DOCUMENTS

| | | |
|---|---|---|
| 2013/0009752 A1 | 1/2013 | Finkenzeller et al. |
| 2013/0040565 A1 | 2/2013 | Suzuki |
| 2013/0057905 A1 | 3/2013 | Okazawa |
| 2013/0057912 A1* | 3/2013 | Park ............... H04W 12/08 |
| | | 358/1.15 |
| 2013/0077124 A1 | 3/2013 | Vojak |
| 2013/0080276 A1 | 3/2013 | Granbery |
| 2013/0083358 A1 | 4/2013 | Suzuki |
| 2013/0097348 A1 | 4/2013 | Milbrandt |
| 2013/0139228 A1 | 5/2013 | Odaira |
| 2013/0141753 A1 | 6/2013 | Kamoi |
| 2013/0165042 A1 | 6/2013 | Gillespie et al. |
| 2013/0166969 A1 | 6/2013 | Zhang et al. |
| 2013/0196595 A1 | 8/2013 | Byrne et al. |
| 2013/0203347 A1 | 8/2013 | Moosavi |
| 2013/0204726 A1 | 8/2013 | Cruttenden et al. |
| 2013/0215467 A1 | 8/2013 | Fein et al. |
| 2013/0229683 A1 | 9/2013 | Nakayama |
| 2013/0229684 A1 | 9/2013 | Yasuzaki |
| 2013/0229690 A1 | 9/2013 | Sumita et al. |
| 2013/0244578 A1 | 9/2013 | Bacioccola |
| 2013/0258390 A1 | 10/2013 | Suzuki et al. |
| 2013/0260683 A1 | 10/2013 | Suzuki et al. |
| 2013/0260684 A1 | 10/2013 | Suzuki et al. |
| 2013/0311313 A1 | 11/2013 | Laracey |
| 2014/0002850 A1 | 1/2014 | Kang |
| 2014/0004793 A1 | 1/2014 | Bandyopadhyay et al. |
| 2014/0038517 A1 | 2/2014 | Asakura |
| 2014/0038518 A1 | 2/2014 | Asakura |
| 2014/0038519 A1 | 2/2014 | Asakura |
| 2014/0047038 A1 | 2/2014 | Piratla et al. |
| 2014/0063537 A1 | 3/2014 | Nishikawa et al. |
| 2014/0068719 A1 | 3/2014 | Kiukkonen et al. |
| 2014/0085654 A1 | 3/2014 | Miyazaki |
| 2014/0104635 A1 | 4/2014 | Nishikawa |
| 2014/0114765 A1 | 4/2014 | Lee |
| 2014/0211237 A1 | 7/2014 | Tsuchitoi et al. |
| 2014/0219453 A1 | 8/2014 | Neafsey et al. |
| 2014/0223512 A1 | 8/2014 | Hagiwara et al. |
| 2014/0252083 A1 | 9/2014 | Lee et al. |
| 2014/0256251 A1 | 9/2014 | Caceres et al. |
| 2014/0293980 A1 | 10/2014 | Shibata |
| 2014/0297892 A1 | 10/2014 | Kaigawa |
| 2014/0304596 A1 | 10/2014 | Chandran et al. |
| 2014/0320908 A1* | 10/2014 | Iwauchi ............. H04L 45/22 |
| | | 358/1.15 |
| 2014/0335790 A1 | 11/2014 | Dees et al. |
| 2014/0355047 A1 | 12/2014 | Lee et al. |
| 2014/0359312 A1 | 12/2014 | Halibard et al. |
| 2014/0368859 A1 | 12/2014 | Gutnik et al. |
| 2014/0378052 A1 | 12/2014 | Hamada |
| 2014/0378060 A1 | 12/2014 | Akama |
| 2015/0067800 A1 | 3/2015 | Hosoda |
| 2015/0093992 A1 | 4/2015 | Tanaka |
| 2015/0126115 A1 | 5/2015 | Yun et al. |
| 2015/0189595 A1 | 7/2015 | Shibao |
| 2015/0205550 A1 | 7/2015 | Lee et al. |
| 2015/0208245 A1 | 7/2015 | Robinton et al. |
| 2015/0213436 A1 | 7/2015 | Griffin et al. |
| 2015/0215481 A1 | 7/2015 | Faust |
| 2015/0220290 A1 | 8/2015 | Park et al. |
| 2015/0270912 A1 | 9/2015 | Dhayni et al. |
| 2015/0280786 A1 | 10/2015 | Bhat |
| 2015/0317116 A1 | 11/2015 | Suzuki et al. |
| 2015/0327172 A1 | 11/2015 | Kusakabe |
| 2015/0350905 A1 | 12/2015 | Suzuki |
| 2015/0382135 A1 | 12/2015 | Kawahara et al. |

FOREIGN PATENT DOCUMENTS

| | | |
|---|---|---|
| CN | 103369637 A | 10/2013 |
| EP | 2296292 A1 | 3/2011 |
| EP | 2645265 A2 | 10/2013 |
| JP | H11-154061 A | 6/1999 |
| JP | 2000-228666 A | 8/2000 |
| JP | 2004-200840 A | 7/2004 |
| JP | 2006-035631 A | 2/2006 |
| JP | 200770047 A | 3/2007 |
| JP | 2007079636 A | 3/2007 |
| JP | 2007079639 A | 3/2007 |
| JP | 2007-166538 A | 6/2007 |
| JP | 2007221682 A | 8/2007 |
| JP | 2009-037566 A | 2/2009 |
| JP | 2009-135865 A | 6/2009 |
| JP | 2010501135 A | 1/2010 |
| JP | 2011-044092 A | 3/2011 |
| JP | 201187249 A | 4/2011 |
| JP | 2011073272 A | 4/2011 |
| JP | 2011-146991 A | 7/2011 |
| JP | 2011-217063 A | 10/2011 |
| JP | 2012-029303 A | 2/2012 |
| JP | 201260609 A | 3/2012 |
| JP | 2013505670 A | 2/2013 |
| JP | 2013-132491 A | 7/2013 |
| JP | 2013-187565 A | 9/2013 |
| JP | 2013-214139 A | 10/2013 |
| JP | 2013-214804 A | 10/2013 |
| JP | 2014071488 A | 4/2014 |
| JP | 2015-008382 A | 1/2015 |
| WO | 03061205 A1 | 7/2003 |
| WO | 2005/017738 A1 | 2/2005 |
| WO | 2008021032 A2 | 2/2008 |
| WO | 2011037725 A2 | 3/2011 |

OTHER PUBLICATIONS

Nov. 17, 2010—"NFC Digital Protocol," NFCForum-TS-DigitalProtocol-1.0.
Aug. 31, 2011—"Simple NDEF Exchange Protocol"—Technical Specification, SNEP 1.0, pp. 1-20.
Aug. 31, 2011—NFC Forum, Simple NDEF Exchange Protocol Technical Specification, NFC Forum, SNEP 1.0, NFCForum-TS-SNEP_1.0.
Aug. 31, 2011—NFC Forum Simlple NDEF Exchange Protocol.
Jul. 4, 2012—Jara, Antonio et al., "Interaction of patients with breathing problems through NFC in Ambient Assisted Living environements," 2012 Sixth International Conference on Innovative Mobile and Internet Services in Ubiquitous Computing, pp. 892-897, XP032234827, DOI: 10.1109/IMIS.2012.150 ISBN: 978-1-4673-1328-5.
May 14, 2012—Monteiro, David et al., "A Secure NFC Application for Credit Transfer Among Mobile Phones," 2012 International Conference on Computer Information and Telecommunication Systems (CITS), IEEE, pp. 1-5, XP032188431, DOI: 10.1109/CITS.2012.6220369 ISBN: 978-1-4673-1549-4.
Jul. 2, 2013—Co-pending U.S. Appl. No. 13/933,419.
Jul. 23, 2013—(EP) Extended Search Report—Application No. 13161732.6.
Mar. 15, 2013—Co-Pending U.S. Appl. No. 13/834,434.
Sep. 23, 2013—(EP) Search Report—App 13174778.4.
Aug. 5, 2014—U.S. Non-Final Office Action—U.S. Appl. No. 13/933,419.
Dec. 12, 2014—U.S. Notice of Allowance—U.S. Appl. No. 13/834,423.
Jan. 17, 2014—(EP) Extended Search Report—App 13179154.3.
Jan. 17, 2014—(EP) Extended Search Report—App 13179157.6.
Jan. 17, 2014—(EP) Search Report—Application No. 13179289.7.
Mar. 13, 2014—Co-pending U.S. Appl. No. 14/208,220.
May 9, 2014—U.S. Non-Final Office Action—U.S. Appl. No. 13/833,236.
May 9, 2014—U.S. Non-Final Office Action—U.S. Appl. No. 13/834,423.
Nov. 26, 2014—U.S. Notice of Allowance—U.S. Appl. No. 13/933,419.
Oct. 20, 2014—U.S. Notice of Allowance—U.S. Appl. No. 13/833,236.
Oct. 27, 2014—(EP) Office Action—App 13159607.4.
Sep. 4, 2014—U.S. Final Office Action—U.S. Appl. No. 13/834,423.
Sep. 9, 2014 Co-pending U.S. Appl. No. 14/498,213 as filed.
Apr. 15, 2015—U.S. Non-Final Office Action—U.S. Appl. No. 13/959,786.

(56) References Cited

OTHER PUBLICATIONS

Aug. 31, 2015—U.S. Non-Final Office Action—U.S. Appl. No. 14/663,923.
Dec. 17, 2015—U.S. Notice of Allowance—U.S. Appl. No. 13/957,479.
Dec. 22, 2015—(CN) Notification of First Office action—App 201310339554.X—Eng Tran.
Dec. 22, 2015—(JP) Notification of Reasons for Rejection—App 2012-082818—Eng Tran.
Feb. 12, 2015—U.S. Non-Final Office Action—U.S. Appl. No. 13/957,490.
Feb. 13, 2015—U.S. Non-Final Office Action—U.S. Appl. No. 13/957,479.
Jul. 13, 2015—U.S. Final Office Action—U.S. Appl. No. 13/957,479.
Jul. 16, 2015—U.S. Final Office Action—U.S. Appl. No. 13/957,490.
Mar. 26, 2015—Co-pending U.S. Appl. No. 14/669,553.
Mar. 31, 2015—U.S. Notice of Allowance—U.S. Appl. No. 13/834,423.
Mar. 6, 2015—(CN) Notification of First Office Action—App 201310097370.7.
May 22, 2015—U.S. Non-Final Office Action—U.S. Appl. No. 13/834,434.
Oct. 2, 2015—U.S. Final Office Action—U.S. Appl. No. 13/959,786.
Oct. 8, 2015—(EP) Extended European Search Report—App 15169695.2.
Oct. 9, 2015—U.S. Non-Final Office Action—U.S. Appl. No. 14/706,368.
Oct. 14, 2015—(EP) Office Action—App 13179157.6.
Sep. 30, 2015—U.S. Notice of Allowance—U.S. Appl. No. 14/208,220.
Apr. 26, 2016—U.S. Non-Final Office Action—U.S. Appl. No. 13/959,786.
Aug. 11, 2016—U.S. Notice of Allowance—U.S. Appl. No. 13/959,786.
Aug. 23, 2016—U.S. Non-Final Office Action—U.S. Appl. No. 14/498,213.
Aug. 24, 2016—U.S. Notice of Allowance—U.S. Appl. No. 14/208,220.
Aug. 25, 2016—U.S. Non-Final Office Action—U.S. Appl. No. 13/834,434.
Aug. 9, 2016—U.S. Notice of Allowance—U.S. Appl. No. 13/957,479.
Dec. 6, 2016—U.S. Notice of Allowance—U.S. Appl. No. 14/706,368.
Dec. 2, 2016—U.S. Notice of Allowance—U.S. Appl. No. 13/957,479.
Jun. 6, 2018—U.S. Notice of Allowance—U.S. Appl. No. 14/669,553.
Jun. 15, 2018—U.S. Notice of Allowance—U.S. Appl. No. 14/498,213.
Mar. 20, 2018—(JP) Notification of Reasons of Rejection—App 2014-113107—Eng Tran.
Mar. 30, 2018—U.S. Non-Final Office Action—U.S. Appl. No. 15/584,056.
Mar. 6, 2018—(JP) Notification of Rejection—App 2017-000214—Eng Tran.
May 25, 2018—U.S. Notice of Allowance—U.S. Appl. No. 15/609,339.
Nov. 1, 2018—U.S. Notice of Allowance—U.S. Appl. No. 15/584,056.
Sep. 12, 2018—U.S. Notice of Allowance—U.S. Appl. No. 15/691,214.
Apr. 2, 2019—U.S. Non-Final Office Action—U.S. Appl. No. 15/904,973.
Feb. 8, 2019—U.S. Notice of Allowance—U.S. Appl. No. 15/855,216.
Feb. 19, 2019—(JP) Notification of Reasons for Rejection—App 2018-041165, Eng Tran.
Jan. 21, 2019—(CN) Notification of the Second Office Action—App 201610330026.1.
Jan. 28, 2019—U.S. Supplemental Notice of Allowance—U.S. Appl. No. 15/691,214.
Jun. 13, 2019—U.S. Non-Final Office Action—U.S. Appl. No. 16/274,472.
Jun. 4, 2019—(CN) Office Action—App 201510279268.8.
Mar. 4, 2019—(EP) Summons to Attend Oral Proceedings—App 13161732.6.
Mar. 4, 2019—(EP) Office Action—App 13161732.6.
Anonymous,: "Near Field Communication White Paper", Feb. 12, 2004, URL:http://www.ecma-international.org/activities/Communications/2004tg19-001 pdf [retrieved on Mar. 6, 2006].
Co-Pending U.S. Appl. No. 13/833,236, filed Mar. 15, 2013.
Information Technology—Telecommunications and information exchange between systems—Near Field Communication—Interface and Protocol (NFCIP-1), ISO/IEC 18092, Second edition, Mar. 15, 2013.
Information Technology—Telecommunications and information exchange between systems—Near Field Communication Interface and Protocol-2 (NFCIP-2), ISO/IEC 21481, Second edition, Jul. 1, 2012.
Nosowitz, D., "Everything You Need to Know about Near Field Communication," Popular Science, posted Mar. 1, 2011.
Requirement for Election issued in U.S. Appl. No. 13/834,423, mailed Feb. 24, 2014.
Smart Cards; UICC-CLF interface; Host Controller Interface P2P LNC Protocol, vol. 1.0, Jan. 11, 2008, pp. 1-33.
U.S. Appl. No. 61/601,496, filed Feb. 21, 2012, Drawings.
U.S. Appl. No. 61/601,496, filed Feb. 21, 2012, Specification.
Wi-Fi Peer-to-Peer (P2P) Technical Specification Version 1.1 2010, pp. 1-159.
Sep. 13, 2019—U.S. Notice of Allowance—U.S. Appl. No. 15/904,973.
Dec. 26, 2019—U.S. Final Office Action—U.S. Appl. No. 16/274,472.
Apr. 16, 2020—U.S. Notice of Allowance—U.S. Appl. No. 16/299,640.
May 14, 2020—U.S. Non-final Office Action—U.S. Appl. No. 16/274,472.
Apr. 13, 2020—(CN) The Second Office Action—App 201510279268.8, Eng Tran.
Sep. 10, 2020—U.S. Notice of Allowance—U.S. Appl. No. 16/743,033.
Jan. 19, 2021—U.S. Notice of Allowance—U.S. Appl. No. 16/743,033.
Nov. 12, 2021—U.S. Non-final Office Action—U.S. Appl. No. 17/132,226.
Dec. 22, 2016—U.S. Notice of Allowance—U.S. Appl. No. 13/957,490.
Feb. 17, 2016—U.S. Final Office Action—U.S. Appl. No. 14/706,368.
Feb. 25, 2016—U.S. Final Office Action—U.S. Appl. No. 13/834,434.
Jan. 12, 2016—(JP) Notification of Reasons for Rejection—App 2012-082819—Eng Tran.
Jan. 25, 2016—U.S. Non-Final Office Action—U.S. Appl. No. 13/957,490.
Jan. 29, 2016—Notice of Allowance—U.S. Appl. No. 14/663,923.
Jun. 20, 2016—U.S. Final Office Action—U.S. Appl. No. 13/957,490.
Jun. 22, 2016—U.S. Notice of Allowance—U.S. Appl. No. 14/706,368.
Mar. 1, 2016—(JP) Notice of Reasons for Rejection—App 2012-193091—Eng Tran.
Mar. 8, 2016—(JP) Notification of Reasons for Rejection—App 2012-173269.
May 3, 2016—(CN) Office Action—App 201310084346.X—Eng Tran.
May 6, 2016—U.S. Non-Final Office Action—U.S. Appl. No. 13/957,479.
May 6, 2016—U.S. Non-Final Office Action—U.S. Appl. No. 14/208,220.
May 11, 2016—U.S. Notice of Allowance—U.S. Appl. No. 14/706,368.
May 17, 2016—(JP) Notification of Reasons for Rejection—App 2012-082818—Eng Trans.
Nov. 2, 2016—U.S. Non-Final Office Action—U.S. Appl. No. 14/669,553.
Nov. 3, 2016—U.S. Non-Final Office Action—U.S. Appl. No. 15/162,995.
Nov. 18, 2016—U.S. Notice of Allowance—U.S. Appl. No. 14/208,220.
Nov. 25, 2016—(CN) Office Action—App 201310084346.X—Eng Tran.
Sep. 6, 2016—U.S. Non-Final Office Action—U.S. Appl. No. 15/132,432.
Apr. 21, 2017—U.S. Final Office Action—U.S. Appl. No. 14/498,213.
Aug. 1, 2017—U.S. Notice of Allowance—U.S. Appl. No. 14/669,553.
Aug. 2, 2017—(EP) Office Action—App 13174778.4.
Aug. 15, 2017—U.S. Non-Final Office Action—U.S. Appl. No. 14/498,213.
Aug. 18, 2017—U.S. Supplemental Notice of Allowance—U.S. Appl. No. 14/706,368.
Feb. 7, 2017—(JP) Notification of Reasons for Rejection—App 2013-204535—Eng Trans.
Jan. 10, 2017—U.S. Notice of Allowance—U.S. Appl. No. 13/834,434.
Jul. 7, 2017—U.S. Notice of Allowance—U.S. Appl. No. 14/706,368.

(56) References Cited

OTHER PUBLICATIONS

Jul. 18, 2017—(JP) Notification of Rejection—App 2016-156230—Eng Tran.
Jul. 27, 2017—(EP) Office Action—App 13161732.6.
Jun. 1, 2017—U.S. Notice of Allowance—U.S. Appl. No. 15/283,829.
Jun. 1, 2017—U.S. Notice of Allowance—U.S. Appl. No. 13/834,434.
Mar. 1, 2017—U.S. Notice of Allowance—U.S. Appl. No. 15/162,995.
Mar. 23, 2017—U.S. Final Office Action—U.S. Appl. No. 14/669,553.
Mar. 29, 2017—U.S. Notice of Allowance—U.S. Appl. No. 15/283,829.
Mar. 3, 2017—U.S. Notice of Allowance—U.S. Appl. No. 15/132,432.
May 4, 2017—U.S. Non-Final Office Action—U.S. Appl. No. 15/287,054.
May 16, 2017—U.S. Notice of Allowance—U.S. Appl. No. 14/706,368.
Nov. 24, 2017—U.S. Notice of Allowance—U.S. Appl. No. 14/669,553.
Oct. 17, 2017—U.S. Non-final Office Action—U.S. Appl. No. 15/691,214.
Sep. 1, 2017—U.S. Notice of Allowance—U.S. Appl. No. 15/287,054.
Sep. 27, 2017—U.S. Notice of Allowance—U.S. Appl. No. 15/617,354.
Apr. 2, 2018—U.S. Final Office Action—U.S. Appl. No. 15/691,214.
Apr. 28, 2018—(CN) First Office Action—App 201610330026.1, Eng Tran.
Aug. 31, 2018—U.S. Non-final Office Action—U.S. Appl. No. 15/855,216.
Dec. 11, 2018—U.S. Notice of Allowance—U.S. Appl. No. 14/669,553.
Dec. 11, 2018—U.S. Notice of Allowance—U.S. Appl. No. 15/691,214.
Jan. 17, 20187—U.S. Non-Final Office Action—U.S. Appl. No. 15/609,339.
Jan. 30, 2018—U.S. Final Office Action—U.S. Appl. No. 14/498,213.
Jul. 10, 2018—(JP) Notification of Reasons for Rejection—App 2017-157066—Eng Tran.
Dec. 27, 2022—U.S. Notice of Allowance—U.S. Appl. No. 17/469,570.
Apr. 29, 2022—U.S. Notice of Allowance—U.S. Appl. No. 17/078,713.
Rajiv et al., machine translation for JP 2012-029303 (Year: 2011).
Sep. 9, 2022—U.S. Non-Final Office Action—U.S. Appl. No. 17/469,570.

\* cited by examiner

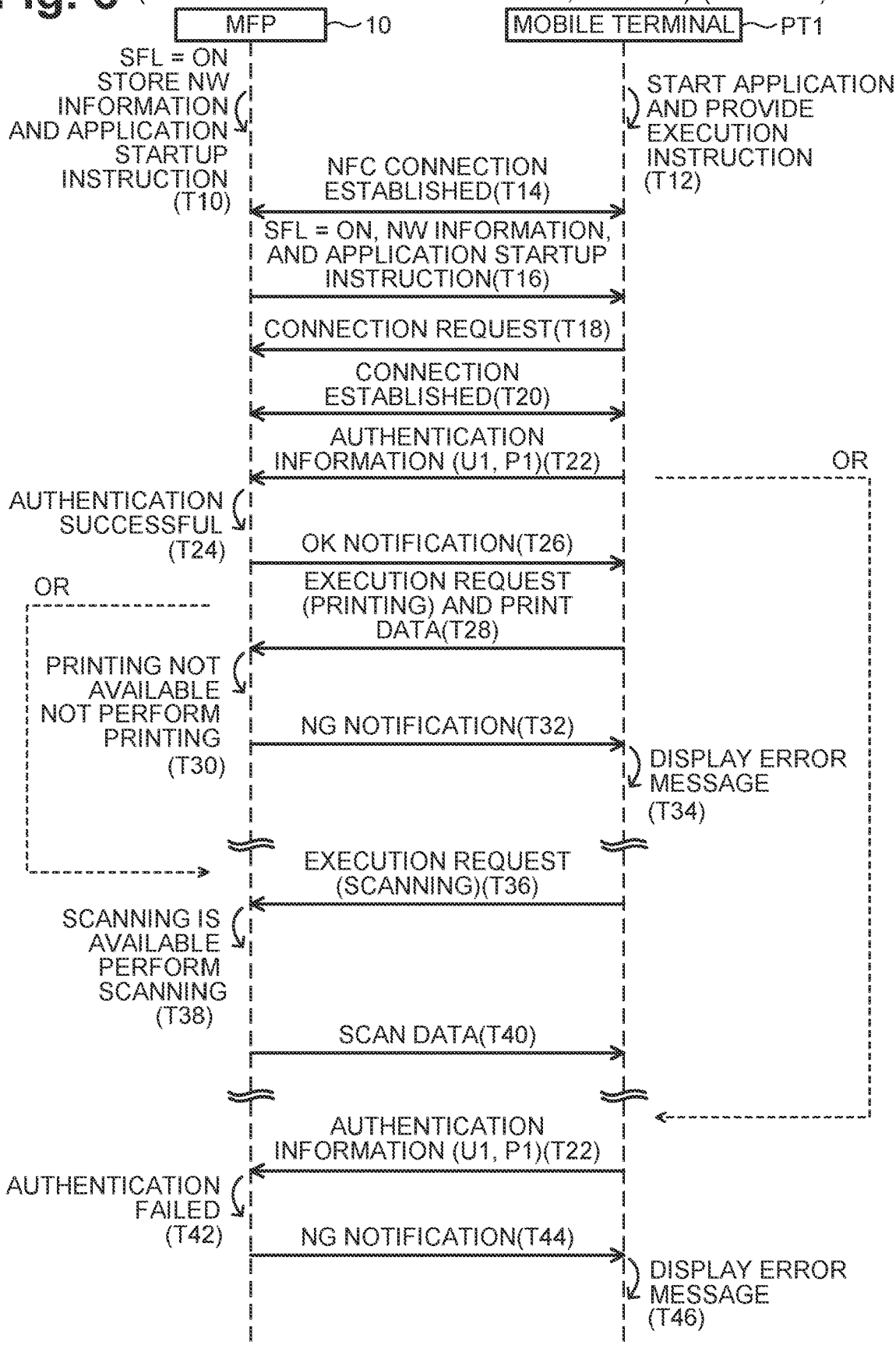
Fig. 5 (FIRST ILLUSTRATIVE EMBODIMENT; CASE A1) (SFL = ON)

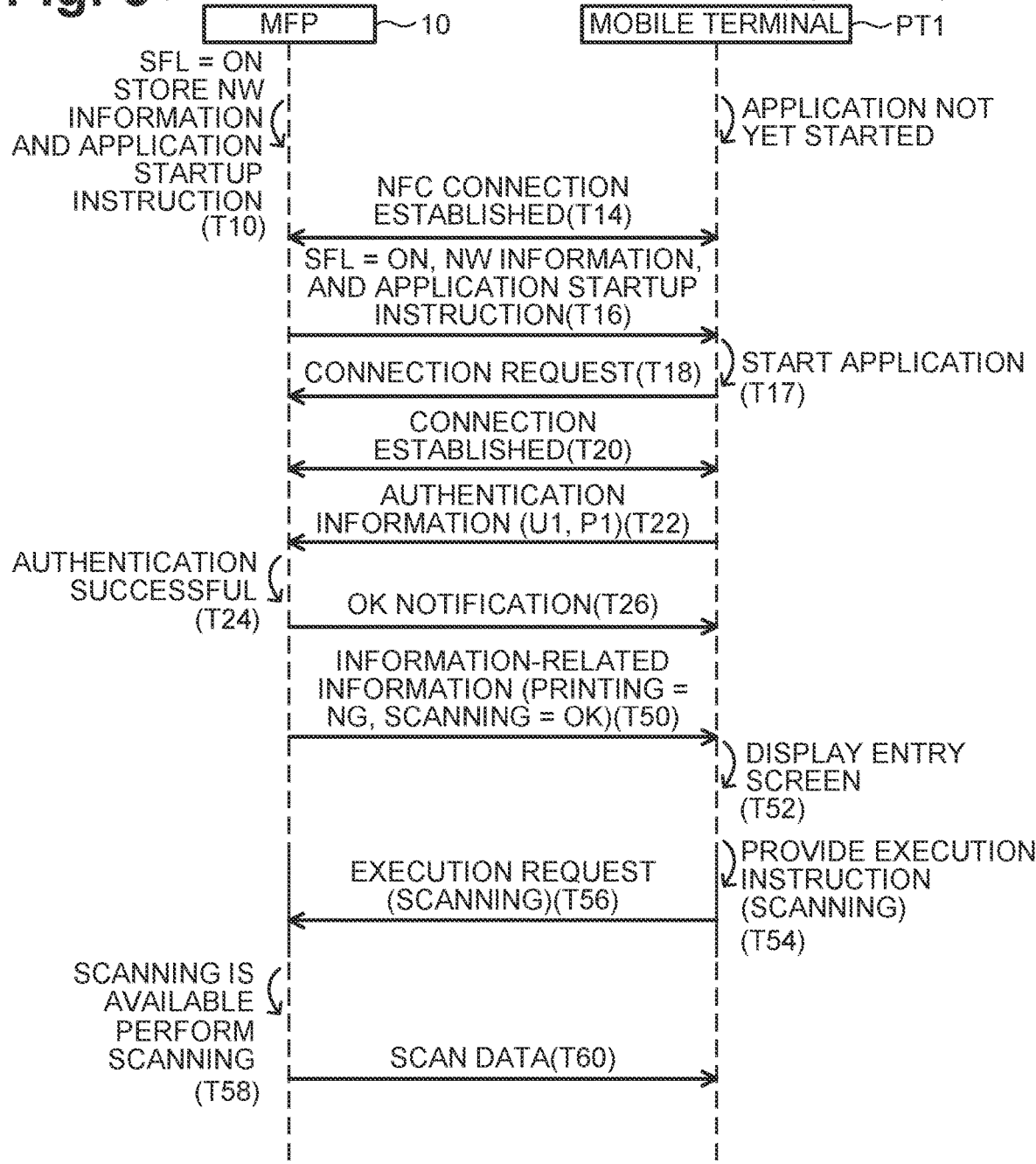

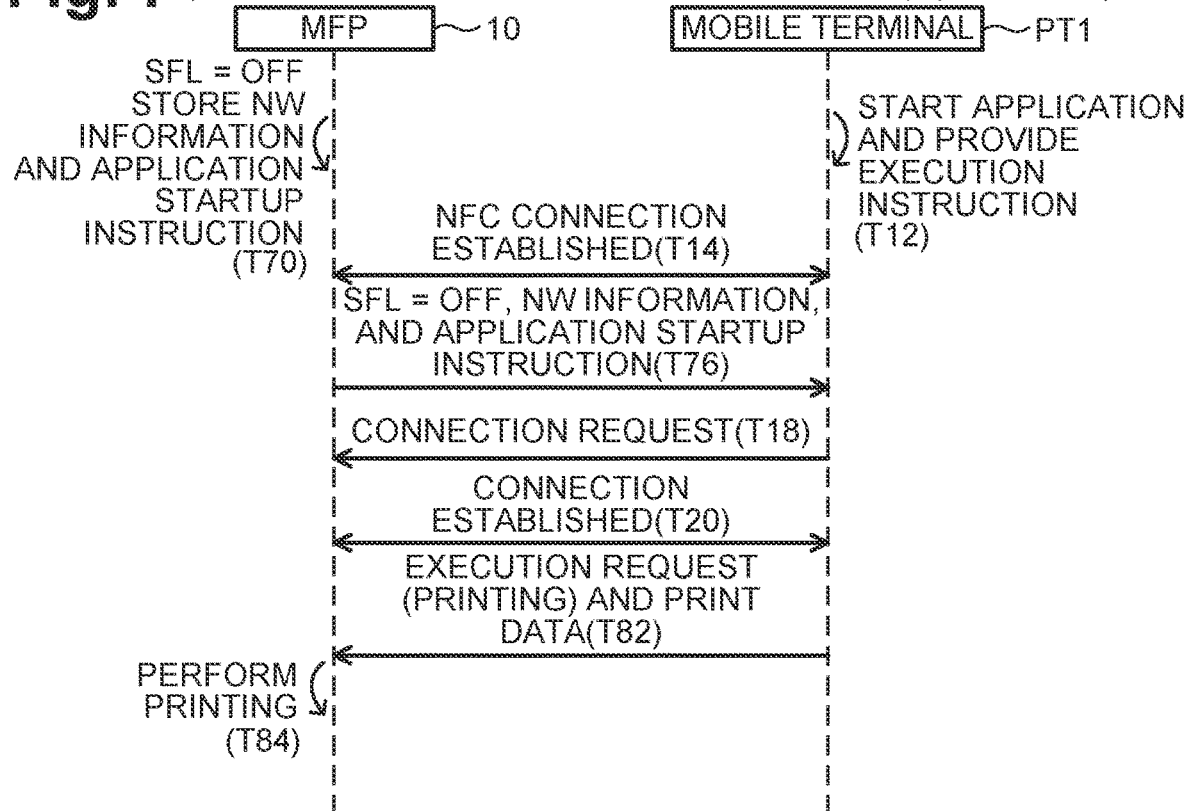

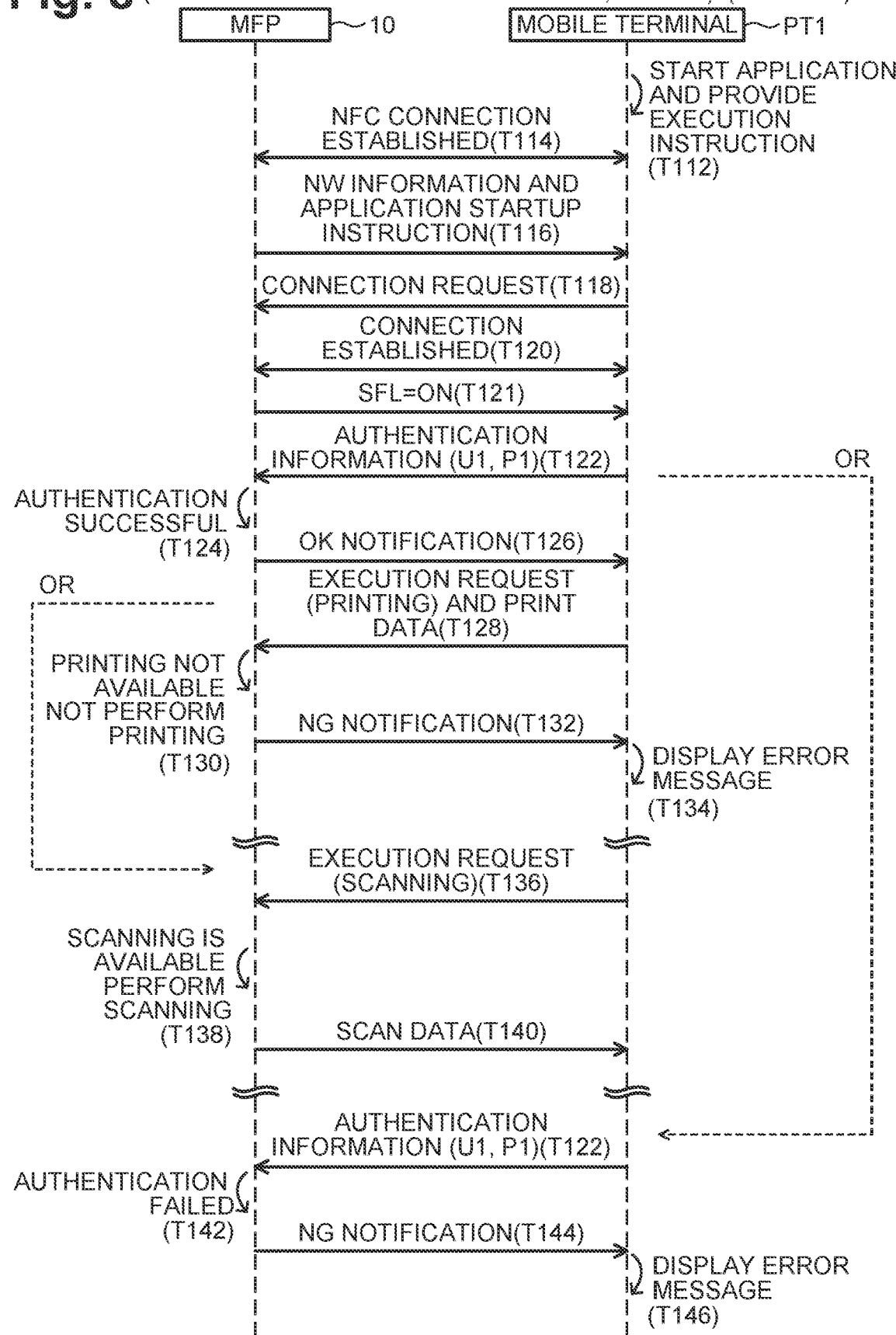

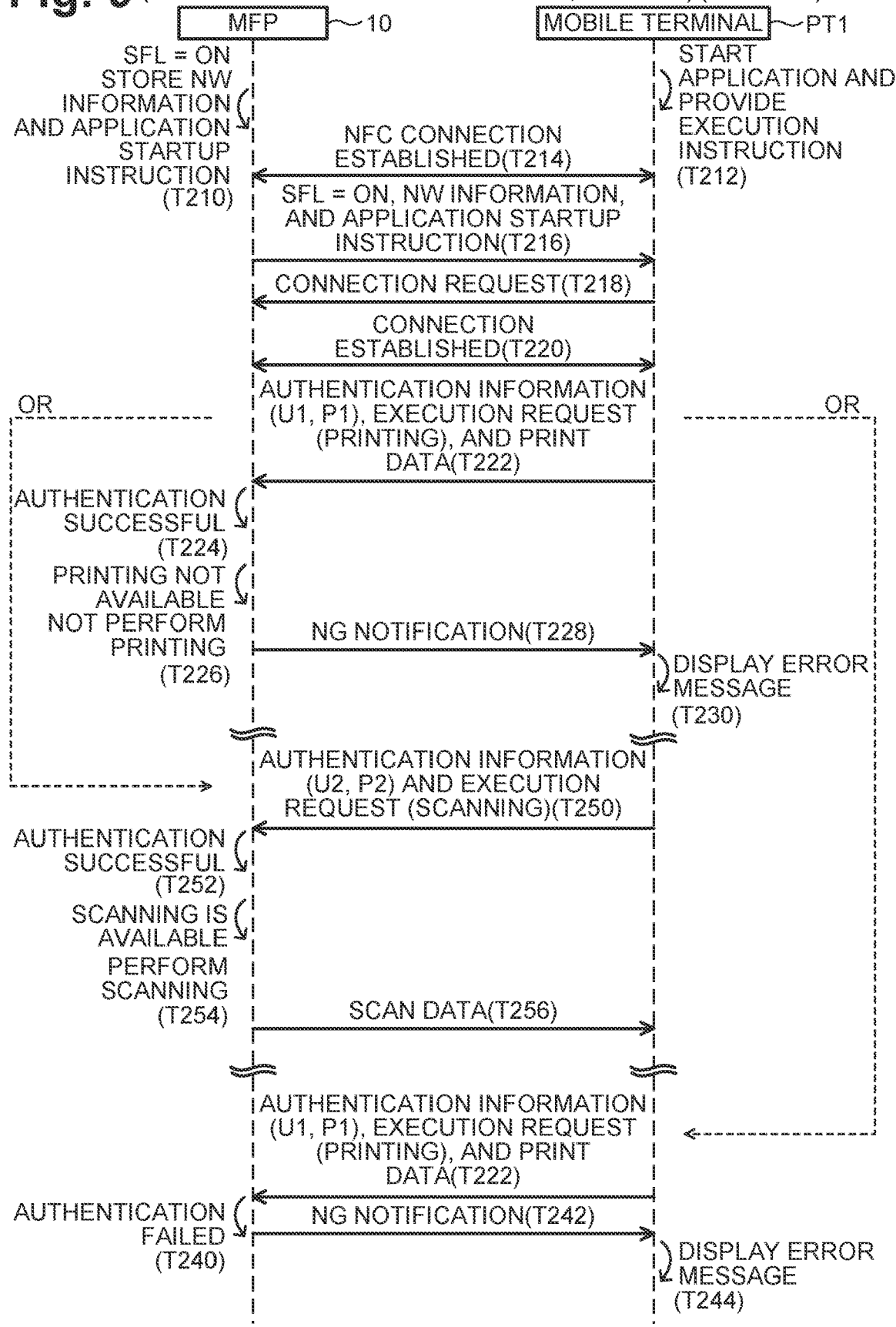
Fig. 9 (THIRD ILLUSTRATIVE EMBODIMENT; CASE C1) (SFL = ON)

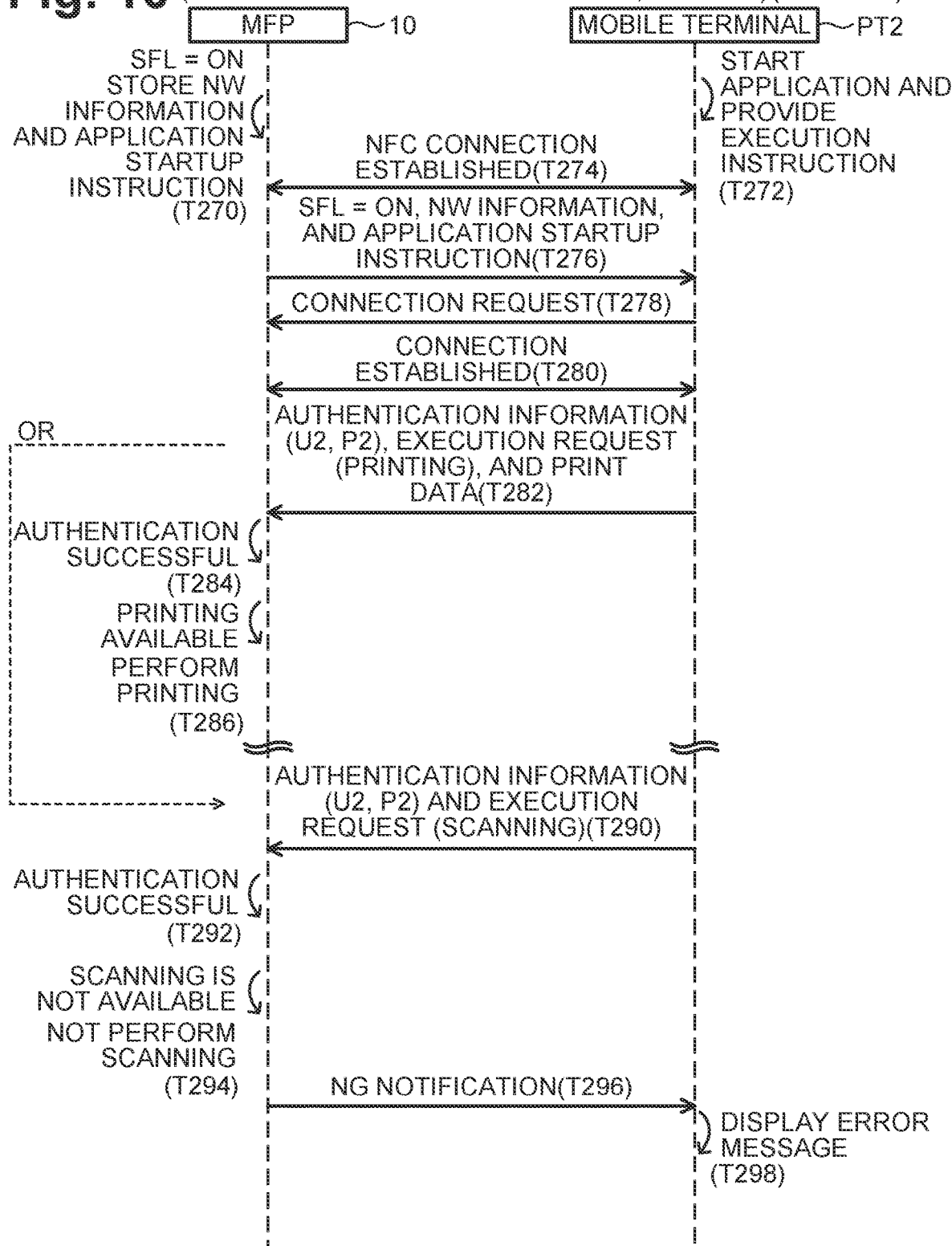

FUNCTION EXECUTION DEVICE AND COMMUNICATION TERMINAL

CROSS-REFERENCE TO RELATED APPLICATION

This application is a continuation of U.S. Ser. No. 17/469,570, filed Sep. 8, 2021, which is a continuation of U.S. Ser. No. 16/720,120, filed Dec. 19, 2019, which is a continuation of U.S. Ser. No. 15/904,973, filed Feb. 26, 2018, now U.S. Pat. No. 10,542,403, issued Jan. 21, 2020, which is a divisional of U.S. Ser. No. 14/669,553, filed Mar. 26, 2015, now U.S. Pat. No. 10,278,045, issued Apr. 30, 2019, which claims priority to Japanese Patent Application No. 2014-113107, filed on May 30, 2014, the contents of which are incorporated herein by reference in their entirety.

TECHNICAL FIELD

Aspects disclosed herein relate to a function execution system including a function execution device and a communication terminal.

BACKGROUND

A known communication device is configured to perform communication with a mobile terminal. Upon receipt of Near Field Communication ("NFC") information via an NFC interface, the communication device determines whether the mobile terminal and the communication device itself belong in the same network using the NFC information. When the communication device determines that the mobile terminal and the communication device itself do not belong in the same network, the communication device establishes connection with the mobile terminal to execute data communication process via a wireless local area network ("LAN").

SUMMARY

Accordingly, aspects of the disclosure provide for a technique for enabling a function execution device to execute a particular function appropriately using a communication terminal that is capable of transmitting particular authentication information listed on a list in a case where the function execution device is allowed to perform communication with the communication terminal selectively via one of a first interface and a second interface that is different from the first interface.

According to the above-described configuration, in a case where the function execution device is allowed to perform communication with the communication terminal selectively via one of the first interface and the second interface that is different from the first interface, the function execution device may perform the particular function appropriately using the communication terminal that is capable of transmitting the particular authentication information listed on the list.

According to the above-described configuration, in a case where the communication terminal is allowed to perform communication with the function execution device selectively via one of the first interface and the second interface that is different from the first interface, the above-described configuration may enable the function execution device to execute the particular function appropriately using the communication terminal that is capable of transmitting the particular authentication information listed on the list.

A system and method for providing an authentication state of a function execution device to a communication terminal is described. In some examples, the authentication state indicates whether authentication information is needed from the communication terminal before the communication terminal can request performance of one or more functions performable by the function execution device. In other examples, the communication terminal may provide to the communication terminal the authentication information irrespective of whether the function execution terminal has previously provided its authentication state to the communication terminal.

Control methods and computer programs for implementing the above-described function execution device, and computer-readable storage media storing the computer programs may have novelty and utility. Control methods and computer programs for implementing the above-described communication terminal, computer programs, and computer-readable storage media storing the computer programs may also have novelty and utility.

DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 5 is a sequence diagram depicting communication performed between devices in Case A1 in the first illustrative embodiment according to one or more aspects of the disclosure.

FIG. 6 is a sequence diagram depicting communication performed between devices in Case A2 in the first illustrative embodiment according to one or more aspects of the disclosure.

FIG. 7 is a sequence diagram depicting communication performed between devices in Case A3 in the first illustrative embodiment according to one or more aspects of the disclosure.

FIG. 8 is a sequence diagram depicting communication performed between devices in Case B in a second illustrative embodiment according to one or more aspects of the disclosure.

FIG. 9 is a sequence diagram depicting communication performed between devices in Case C1 in a third illustrative embodiment according to one or more aspects of the disclosure.

FIG. 10 is a sequence diagram depicting communication performed between devices in Case C2 in the third illustrative embodiment according to one or more aspects of the disclosure.

DETAILED DESCRIPTION

Figure 1:
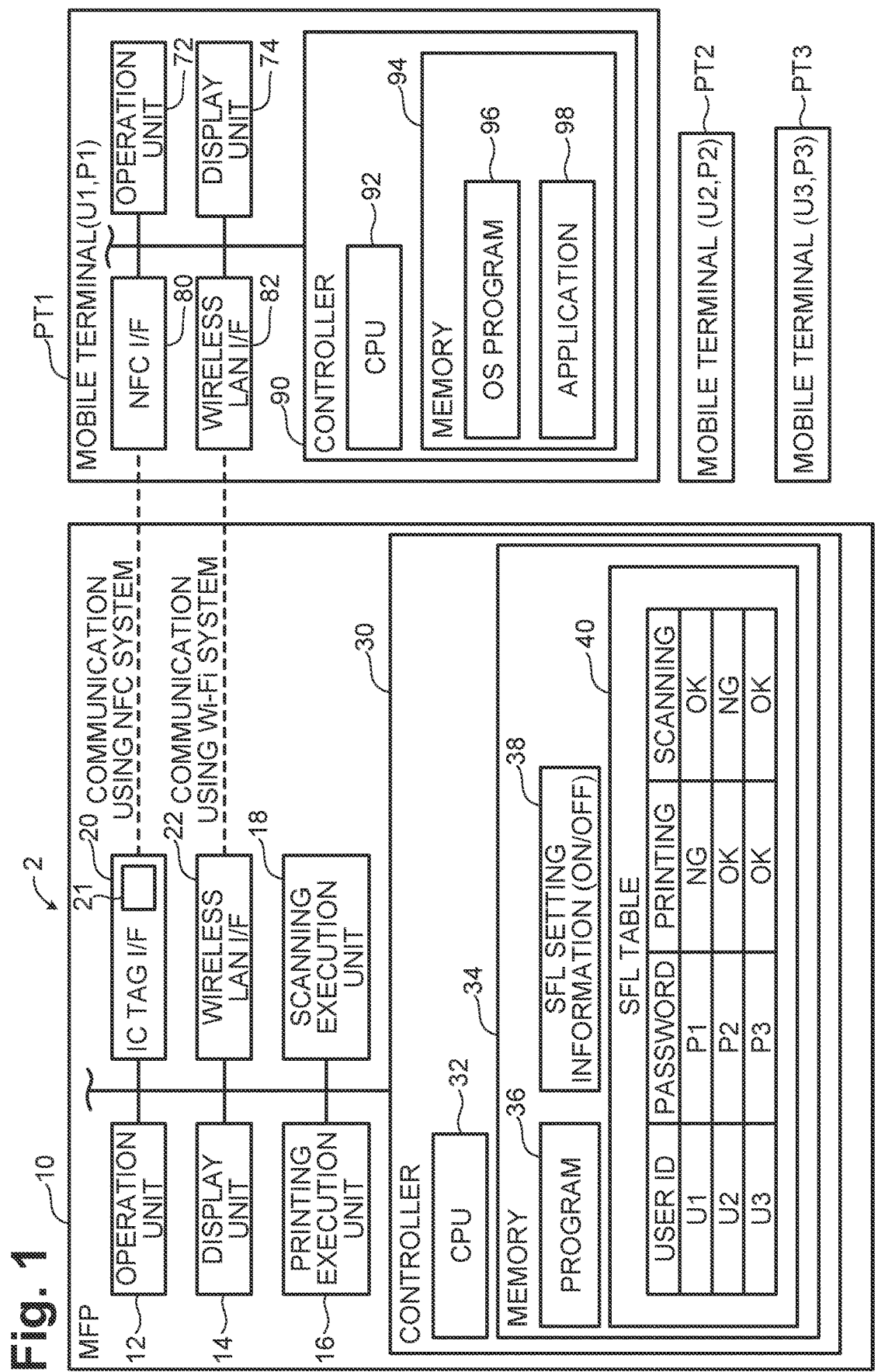
FIG. 1 illustrates an example configuration of a function execution system in a first illustrative embodiment according to one or more aspects of the disclosure.

Hereinafter, illustrative embodiments will be described with reference to the accompanying drawings. Referring to FIG. 1, an example configuration of a function execution system 2 according to a first illustrative embodiment will be described. As depicted in FIG. 1, the function execution system 2 includes a multifunction peripheral ("MFP") 10 and mobile terminals PT1, PT2, and PT3. Each of the MFP 10 and the mobile terminals PT1, PT2, and PT3 is configured to perform wireless communication using a communication protocol that complies with a Near Field Communication ("NFC") standard (i.e., an NFC communication protocol). Each of the MFP 10 and the mobile terminals PT1, PT2, and PT3 is configured to also perform wireless communication using another communication protocol that complies with a Wireless Fidelity ("Wi-Fi®") communication protocol created by the Wi-Fi Alliance (Wi-Fi® is a registered certification mark owned by the Wi-Fi Alliance of Austin, Tex.).

Referring to FIG. 1, an example configuration of the MFP 10 will be described. The MFP 10 is a peripheral device (e.g., a personal-computer ("PC") peripheral device) that is capable of performing multiple functions, for example, a printing function and a scanning function. The MFP 10 includes an operation unit 12, a display unit 14, a printing execution unit 16, a scanning execution unit 18, an integrated circuit ("IC") tag interface 20, a wireless local area network ("LAN") interface 22, and a controller 30, each of which are connected with a bus (reference numeral is omitted). Hereinafter, the interface may be abbreviated to "I/F".

The operation unit 12 includes a plurality of keys. A user is allowed to input various instructions into the MFP 10 by operating the operation unit 12. The display unit 14 includes a display that is configured to display various information thereon. The printing execution unit 16 includes a printing mechanism using one of an inkjet method and a laser method. The scanning execution unit 18 includes a scanning mechanism using one of a charge-coupled device ("CCD") and a contact image sensor ("CIS").

The IC tag I/F 20 is configured to allow the controller 30 to perform wireless communication using the NFC communication protocol, i.e., short-range wireless communication. In this illustrative embodiment, the NFC communication protocol may be a wireless communication method for performing wireless communication in compliance with the International standard, e.g., ISO/IEC 21481 or ISO/IEC 18092. There have been known an NFC Forum device and an NFC Forum tag as interfaces for performing NFC communication. The IC tag I/F 20 may be an NFC Forum tag and function as an IC tag that complies with the International standard, e.g., ISO/IEC 21481 or ISO/IEC 18092.

The NFC Forum device is an interface that is configured to operate selectively in one of a Peer-to-Peer ("P2P") mode, a Reader/Writer ("R/W") mode and a Card Emulation ("CE") mode. For example, in a case where both an NFC I/F of a first device and an NFC I/F of a second device operate in the P2P mode, the first and second devices are allowed to perform two-way communication of information therebetween. In a case where, for example, the NFC I/F of the first device operates in the Reader mode of the R/W mode and the NFC I/F of the second device operates in the CE mode, the first device is allowed to read the information from the second device, i.e., to receive information from the second device. For example, in a case where the NFC I/F of the first device operates in the Writer mode of the R/W mode and the NFC I/F of the second device operates in the CE mode, the first device is allowed to write in information into the second device, i.e., to transmit information to the second device.

The NFC Forum tag, e.g., the IC tag I/F 20, may be an interface that is configured to function as only an IC tag, i.e., an interface that is not configured to operate selectively in one of the above-described three modes. For example, in a case where the NFC I/F 80 of the mobile terminal PT1 operates in the Reader mode of the RAY mode, the mobile terminal PT1 is allowed to read information from the IC tag I/F 20 of the MFP 10, i.e., to receive information from the MFP 10.

Since the NFC Forum tag is not such an interface that is configured to operate selectively in one of the above-described three modes, the NFC Forum tag may have a simple configuration as compared with the NFC Forum device. That is, the IC chip has a simple configuration. Generally speaking, the IC chip functioning as the NFC Forum tag may be obtained at a reasonable cost as compared with the IC chip functioning as the NFC Forum device. An interface of either one of power supply type of a passive type and an active type may be used for the IC tag I/F 20.

In the illustrative embodiment, the IC tag I/F 20 includes an interface memory 21 for storing therein information provided by the controller 30 for a while (e.g., a certain time period until another information is provided by the controller 30). In a second illustrative embodiment described below, a memory whose contents cannot be changed by the CPU 32 is adopted as the interface memory 21, and the IC tag I/F 20 is not connected to the bus.

The wireless LAN I/F 22 is configured to allow the controller 30 to perform wireless communication using Wi-Fi Direct™ ("WFD") (Wi-Fi Direct™ is a certification mark owned by the Wi-Fi Alliance of Austin, Tex.) (hereinafter, referred to as "WFD communication"). The detail of the WFD communication protocol is specified in the "Wi-Fi Peer-to-Peer (P2P) Technical Specification Version 1.1" drafted by the Wi-Fi Alliance. U.S. Patent Application Publication No. 2013/0260683 also discloses the detail of the WFD communication protocol, the content of which is incorporated herein by reference in its entirety.

Hereinafter, a device that is capable of performing WFD communication in compliance with the WFD communication protocol (e.g., the MFP 10) is referred to as a "WFD-enabled device". The WFD standard defines three statuses of the WFD-enabled device: a group owner ("G/O") status, a client ("CL") status, and a device status. The WFD-enabled device is configured to operate selectively in one of the three statuses. A WFD-enabled device having the G/O status is referred to as a "G/O-status device". A WFD-enabled device having the CL status is referred to as a "CL-status device". The WFD network is also referred to as a "WFDNW".

In the illustrative embodiment, although the MFP 10 is a WFD-enabled device, the MFP 10 might not be capable of operating in the CL status. In addition, the MFP 10 might not be installed with a program for executing a G/O negotiation with another WFD-enabled device. That is, the MFP 10 is configured to operate selectively in one of the G/O status and the device status.

Dissimilarities between the IC tag I/F 20 and the wireless LAN I/F 22 will be described below. A communication speed (e.g., a maximum communication speed is 11 to 600

Mbps) of wireless communication via the wireless LAN I/F 22 may be faster than a communication speed (e.g., a maximum communication speed is 100 to 424 kbps) of wireless communication using the IC tag I/F 20. A frequency (e.g., 2.4 GHz band or 5.0 GHz band) of a carrier in wireless communication using the wireless LAN I/F 22 may also differ from a frequency (e.g., 13.56 MHz band) of a carrier in wireless communication using the IC tag I/F 20. The controller 30 is allowed to perform NFC communication between the MFP 10 and the mobile terminal PT1 via the IC tag I/F 20 in a situation where a distance between the MFP 10 and the mobile terminal PT1 is shorter than or equal to approximately 10 cm. The controller 30 is allowed to perform WFD communication between the MFP 10 and the mobile terminal PT1 via the wireless LAN I/F 22 in a situation where the distance between the MFP 10 and the mobile terminal PT1 is longer than, shorter than or equal to approximately 10 cm (e.g., a maximum communicable distance is approximately 100 m). That is, a maximum distance that the MFP 10 can communicate with the target device (e.g., the mobile terminal PT1) wirelessly via the wireless LAN I/F 22 is longer than a maximum distance that the MFP 10 can communicate with the target device wirelessly via the IC tag I/F 20.

The controller 30 includes a central processing unit ("CPU") 32 and a memory 34. The CPU 32 includes a processor that executes various processes in accordance with a program 36 (e.g., instructions) stored in the memory 34. The memory 34 further stores therein Secure Function Lock ("SFL") setting information 38 and an SFL table 40. The SFL setting information 38 indicates one of "ON" and "OFF" that is designated by the user. When the CPU 32 receives authentication information (e.g., the user ID and the password) from another device via the IC tag I/F 20 while the SFL setting information 38 indicates "ON", the CPU 32 determines whether the received authentication information is listed on the SFL table 40 (i.e., CPU 32 executes authentication). When the SFL setting information 38 indicates "OFF", the CPU 32 does not execute authentication even when the CPU 32 receives the authentication information from another device via the IC tag I/F 20. Hereinafter, the state where the SFL setting information 38 indicates "ON" is also referred as to "the SFL is "ON"" and the state where the SFL setting information 38 indicates "OFF" is also referred to as "the SFL is "OFF"".

The SFL table 40 includes a plurality pieces of combined information, each of which include, for example, a user ID (e.g., "U1"), a password (e.g., "P1"), availability information for printing function (e.g., "OK" or "NG"), and availability information for scanning function (e.g., "OK" or "NG") which are associated with each other. The plurality pieces of combined information are provided for a plurality of mobile terminals including the mobile terminal PT1, respectively. In each combined information, the user ID identifies a user of a mobile terminal. The password is associated with the user ID. The availability information for printing function indicates whether the printing function is available to the user. The availability information for scanning function indicates whether the scanning function is available to the user. In the SFL table 40, "OK" indicates that a particular function is available to a particular user and "NG" indicates that a particular function is not available to a particular user. A combination of the availability information for printing function (e.g., "OK" or "NG") and the availability information for scanning function (e.g., "OK" or "NG") is also referred to as "function related information". The SFL table 40 is prestored in the memory 34 by a person responsible for maintaining the MFP 10. For example, the SFL table 40 depicted in FIG. 1 includes combined information in which "USER ID=U1", "PASSWORD=P1", "PRINTING=NG", and "SCANNING=OK" are associated with each other.

The memory 34 further includes an NW storage area. The NW storage area stores information relating to a WFDNW configured by the MFP 10. The MFP 10 is configured to serve as a master in a WFDNW (i.e., as a G/O-status device) and configure the WFDNW in which the MFP 10 itself serves as a master.

That is, the NW storage area stores network information to be used in the WFDNW configured by the MFP 10 and a management list. The network information includes a service set identifier ("SSID"), an authentication method, an encryption method, and a password. The management list may store therein one or more media access control ("MAC") addresses of one or more devices serving as a CL-status device in the WFDNW. That is, the management list is configured to store therein one or more MAC addresses of one or more devices, each of which establishes wireless connection with the MFP 10 that serves as a master in the WFDNW.

Next, configurations of the mobile terminals PT1, PT2, and PT3 will be further described with reference to FIG. 1. The mobile terminals PT1, PT2, and PT3 each may include a portable terminal device such as a mobile phone (e.g., smartphone), a personal digital assistant ("PDA"), a notebook PC, a tablet PC, a mobile music player, and/or a mobile video player.

Hereinafter, an example configuration of the mobile terminal PT1 will be described. The mobile terminals PT2 and PT3 may have the same configuration as the mobile terminal PT1. The mobile terminal PT1 includes an operation unit 72, a display unit 74, an NFC I/F 80, a wireless LAN I/F 82, and a controller 90, each of which are connected with a bus (reference numeral is omitted).

The operation unit 72 includes a plurality of keys. The user is allowed to input various instructions into the mobile terminal PT1 by operating the operation unit 72. The display unit 74 includes a display that is configured to display various information thereon. The NFC I/F 80 is configured to allow the controller 90 to perform NFC communication using the NFC communication protocol. The NFC I/F 80 is an NFC Forum device. In the illustrative embodiment, the NFC I/F 80 operates in the Reader mode. Thus, the controller 90 of the mobile terminal PT1 is allowed to read information from the IC tag I/F 20 of the MFP 10 via the NFC I/F 80. The wireless LAN I/F 82 may have the same configuration as the wireless LAN I/F 22 of the MFP 10. Accordingly, the mobile terminal PT1 is capable of performing selectively either one of NFC communication and using the NFC communication protocol and communication using the Wi-Fi® communication protocol.

The controller 90 includes a CPU 92 and a memory 94. The CPU 92 includes a processor that performs various executes in accordance with a program 96 or an application 98 (e.g., instructions) stored in the memory 94.

The operation system ("OS") program 96 is a program designed to enable the mobile terminal PT1 to perform basic operations. The application 98 is a program designed to enable the MFP 10 to execute a particular function, e.g., the printing function or the scanning function. The application 98 is supplied by a vendor of the MFP 10, and may be installed on the mobile terminal PT1 from a server on the Internet or from a medium supplied with the MFP 10.

The memory 94 further stores therein a user ID (e.g., "U1") that identifies the user of the mobile terminal PT1 and a password (e.g., "P1") that is associated with the user ID. Hereinafter, a combination of the user ID and the password may also be referred to as "authentication information". During initial setting of the installed application 98, the user of the mobile terminal PT1 enters the user ID (e.g., "U1") and password (e.g., "P1") obtained in advance by operating the operation unit 72. For example, the user may obtain the user ID and password prestored in the memory 34 of the MFP 10 by notification from the person responsible for maintaining the MFP 10. The CPU 92 stores the entered user ID and password (e.g., authentication information) in the memory 94.

Likewise, a memory of the mobile terminal PT2 stores therein a user ID (e.g., "U2") and a password (e.g., "P2") of a user of the mobile terminal PT2, and a memory of the mobile terminal PT3 stores therein a user ID (e.g., "U3") and a password (e.g., "P3") of a user of the mobile terminal PT3.

Figure 2:
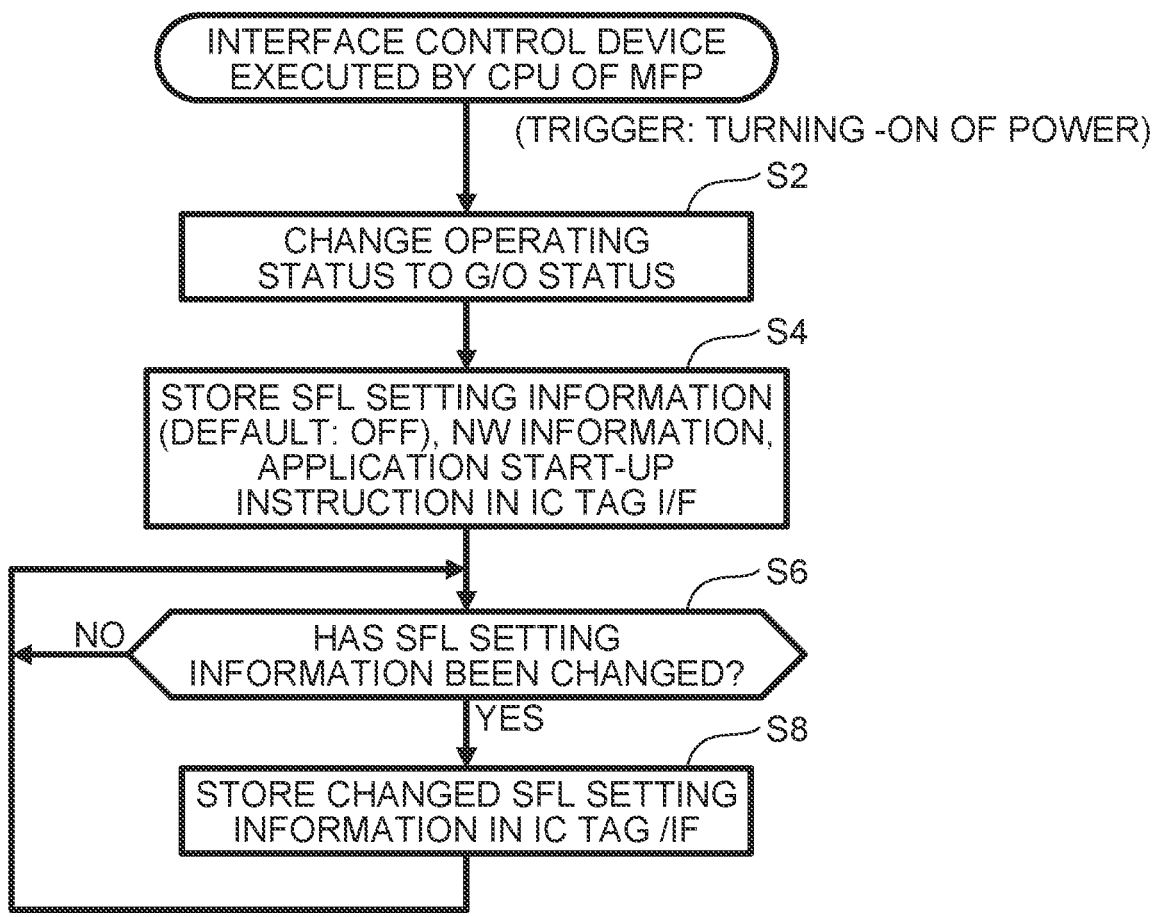
FIG. 2 is a flowchart depicting an example interface control process executed by a central processing unit ("CPU") of a multifunction peripheral ("MFP") in the first illustrative embodiment according to one or more aspects of the disclosure.

Referring to FIG. 2, a detail of an interface control process executed by the CPU 32 of the MFP 10 will be described below. As the power of MFP 10 is turned on, the CPU 32 starts the interface control process of FIG. 2.

In step S2, the CPU 32 changes the operating status of the MFP 10 from the device status, which is a default status, to the G/O status. Thus, the MFP 10 starts serving as a G/O-status device. That is, a WFDNW in which the MFP 10 serves as a master is configured. The CPU 32 prepares network information to be used in the WFDNW. More specifically, the CPU 32 generates a unique SSID. The CPU 32 further generates a password, for example, by selecting characters randomly. The CPU 32 further prepares a predetermined authentication method and encryption method. The CPU 32 stores the prepared network information in the memory 34.

In step S4, the CPU 32 stores SFL setting information, the network information stored in the memory 34 in step S2, and an application startup instruction in the interface memory 21 of the IC tag I/F 20. The SFL setting information may be the SFL setting information 38 stored in the memory 34. The default of the SFL setting information 38 is "OFF". The application startup instruction is included in the program 36 in advance. The application startup instruction is an instruction for starting the application 98 stored in the memory 94 of the mobile terminal PT1.

In step S6, the CPU 32 monitors changing of the SFL setting information 38. The user of the MFP 10 is allowed to change the state of the SFL between "ON" and "OFF by operating the operation unit 12. In response to the change instruction issued by the user, the CPU 32 changes the state of the SFL between the state where the SFL setting information 38 indicates "ON" and the state where the SFL setting information 38 indicates "OFF". When the state of the SFL setting information 38 is changed, the CPU 32 makes a positive determination (e.g., YES) in step S6, and the routine proceeds to step S8.

In step S8, the CPU 32 stores the changed SFL setting information 38 in the interface memory 21 of the IC tag I/F 20.

Subsequent to step S8, in step S6, the CPU 32 monitors again changing of the SFL setting information 38. While the power of the MFP 10 is on, the CPU 32 continues the monitoring in step S6.

Figure 3:
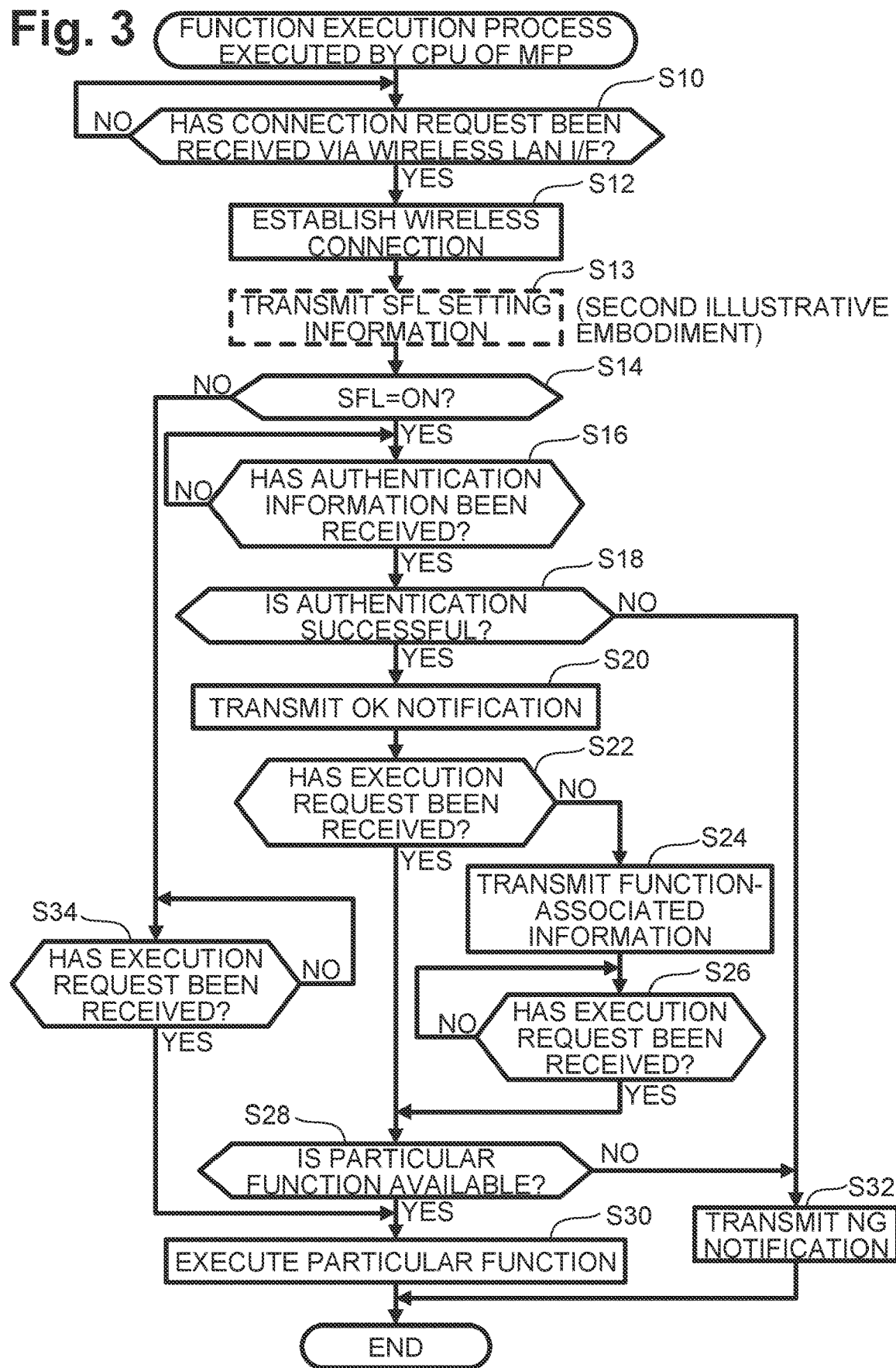
FIG. 3 is a flowchart depicting an example function execution process executed by the CPU of the MFP in the first illustrative embodiment according to one or more aspects of the disclosure.

Referring to FIG. 3, a detail of a function execution process executed by the CPU 32 of the MFP 10 will be described below. Upon starting of the monitoring in step S6 in the interface control process of FIG. 2 after the power of the MFP 10 is turned on, the CPU 32 starts the function execution process of FIG. 3.

In step S10, the CPU 32 monitors receipt of a connection request from a mobile terminal (e.g., the mobile terminal PT1) via the wireless LAN I/F 22. Hereinafter, a mobile terminal that transmits a connection request to the MFP 10 is referred to as a "target terminal".

When a user of a target terminal requests the MFP 10 to execute a particular function, e.g., the printing function, the user brings the target terminal to the MFP 10. At this point, an operation for staring the application 98 for the MFP 10 and an operation for designating the particular function may or might not have been performed on the target terminal. The NFC I/F of the target terminal (e.g., the NFC I/F 80 of the mobile terminal PT1) operates in the Reader mode. As a distance between the NFC I/F of the target terminal and the IC tag I/F 20 of the MFP 10 becomes a certain distance or shorter in which NFC communication can be performed therebetween (e.g., approximately 10 cm), an NFC communication session is established therebetween. In this case, the target terminal reads the stored SFL setting information, network information, and application startup instruction from the interface memory 21 of the IC tag I/F 20 using the established communication session. That is, the IC tag I/F 20 transmits, to the target terminal, the SFL setting information, network information, and application startup instruction stored in the interface memory 21 of the IC tag I/F 20. Subsequently, the target terminal transmits, to the MFP 10, a connection request (more specifically, a Probe Request) including the SSID (e.g., network information) read from the IC tag I/F 20, via the wireless LAN I/F of the target terminal (e.g., step S56 in FIG. 4). Upon receipt of the connection request from the target terminal via the wireless LAN I/F 22, the CPU 32 makes a positive determination (e.g., YES) in step S10, and the routine proceeds to step S12.

In step S12, the CPU 32 executes processing for establishing wireless connection in conjunction with the target terminal to establish wireless connection between the MFP 10 and the target terminal. More specifically, in response to receipt of the connection request (e.g., the Probe Request), the CPU 32 transmits a Probe Response to the target terminal. Subsequently, the CPU 32 receives an Authentication Request and an Association Request sequentially from the target terminal and transmits an Authentication Response and an Association Response sequentially to the target terminal in response to the Authentication Request and the Association Request, respectively. Through this step, it is determined whether the network information stored in the NW information storage area of the memory 34 of the MFP 10 matches the network information transmitted by the target terminal. Then, the CPU 32 executes a four-way handshake with the target terminal Upon completion of the above processing, wireless connection is established between the MFP 10 and the target terminal. Thus, the CPU 32 permits the target terminal to participate in the WFDNW configured in step S2 in FIG. 2, as a slave (e.g., as a CL-status device). The CPU 32 thus lists a MAC address of the target terminal in the management list (e.g., in the management list of the G/O-status device), whereby a belonging situation in which both the MFP 10 and the target terminal belong in the same WFDNW is established.

In step S14, the CPU 32 determines whether the SFL is "ON" (SFL=ON).

Processing of step S13 in FIG. 3 may be executed in the second illustrative embodiment but might not be executed in the first illustrative embodiment. When the CPU 32 determines that the SFL setting information 38 stored in the memory 34 indicates "ON", the CPU 32 makes a positive determination (e.g., YES) in step S14, and the routine proceeds to step S16. When the CPU 32 determines that the SFL setting information 38 stored in the memory 34 indicates "OFF", the CPU 32 makes a negative determination (e.g., NO) in step S14, and the routine proceeds to step S34.

In step S34, the CPU 32 monitors receipt of an execution request for execution of a particular function of the plurality of functions (e.g., the printing function and the scanning function) of the MFP 10 from the target terminal. When an operation for instructing execution of the particular function (hereinafter, also referred to as an "execution instruction") is performed on the target terminal, the target terminal transmits an execution request to the MFP 10 via the wireless LAN I/F of the target terminal. The execution request includes information that indicates the particular function designated to be executed through the target terminal (e.g., the printing function). In particular, when the execution request including information indicating the printing function, the target terminal transmits, to the MFP 10, print data representing an image of a print target, in addition to the execution request. Upon receipt of the execution request from the target terminal using the WFDNW via the wireless LAN I/F 22, the CPU 32 makes a positive determination (e.g., YES) in step S34, and the routine proceeds to step S30.

In step S16, the CPU 32 monitors receipt of authentication information from the target terminal. With reference to the SFL setting information obtained from the IC tag I/F 20, the target terminal may obtain information that the SFL of the MFP 10 is "ON". In this case, the target terminal transmits, to the MFP 10, the authentication information (e.g., the user ID and the password) stored in the memory (e.g., the memory 94) of the target terminal, using the WFDNW via the wireless LAN I/F of the target terminal. Upon receipt of the authentication information from the target terminal using the WFDNW via the wireless LAN I/F 22, the CPU 32 makes a positive determination (e.g., YES) in step S16, the routine proceeds to step S18.

In step S18, the CPU 32 executes authentication using the received authentication information and determines whether the authentication is successful. More specifically, in step S18, the CPU 32 determines whether the combined information including the received authentication information (e.g., the user ID and the password) is included in the SFL table 40. When the CPU 32 determines that the authentication information is included in the SFL table 40, the CPU 32 makes a positive determination (e.g., YES) in step S18 (e.g., the CPU 32 determines that the authentication is successful), and the routine proceeds to step S20. When the CPU 32 determines that the authentication information is not included in the SFL table 40, the CPU 32 makes a negative determination (e.g., NO) in step S18 (e.g., the CPU 32 determines that the authentication is failed), and the routine proceeds to step S32.

In step S20, the CPU 22 transmits, to the target terminal, an OK notification indicating that the authentication is successful, using the WFDNW via the wireless LAN I/F 22.

In step S22, the CPU 22 monitors receipt of an execution request from the target terminal. Processing executed in step S22 may be substantially the same as the processing executed in step S34. Upon receipt of the execution request from the target terminal, the CPU 32 makes a positive determination (e.g., YES) in step S22, and the routine proceeds to step S28. When the CPU 32 has not received an execution request from the target terminal within a predetermined time period (e.g., within five seconds), the CPU 32 makes a negative determination (e.g., NO) in step S22, and the routine proceeds to step S24.

In step S24, with reference to the SFL table 40 (see FIG. 1), the CPU 22 transmits, to the target terminal, function related information (e.g., the availability information for printing function (e.g., "OK" or "NG") and the availability information for scanning function (e.g., "OK" or "NG")) corresponding to the valid authentication information (e.g., the user ID and the password).

In step S26, the CPU 22 monitors receipt of an execution request from the target terminal. Processing executed in step S26 may be substantially the same as the processing executed in step S34. Upon receipt of the function related information (e.g., step S24) from MFP 10, the target terminal displays an entry screen on a display unit of the target terminal (e.g., the display unit 74 of the mobile terminal PT1) to prompt the user to perform an execution instruction (e.g., steps S68 and S70). As the user designates a particular function and performs an execution instruction, the target terminal transmits an execution request to the MFP 10. Upon receipt of the execution request from the target terminal, the CPU 22 makes a positive determination (e.g., YES) in step S26, and the routine proceeds to step S28.

In step S28, the CPU 32 determines whether the function designated by the execution request is available to the user identified by the user ID that is received when a positive determination (e.g., "YES") is made in step S16 (e.g., the authenticated user). More specifically, in step S28, with reference to the SFL table 40 (see FIG. 1), the CPU 32 determines whether "PRINTING=OK" (or "SCANNING=OK") is associated with the received user ID. For example, in a case where the function designated by the execution request is the printing function, if "PRINTING=OK" is associated with the received user ID, the CPU 32 makes a positive determination (e.g., YES) in step S28, and the routine proceeds to step S30. In the same situation, if "PRINTING=NG" is associated with the received user ID, the CPU 32 makes a negative determination (e.g., NO) in step S28, and the routine proceeds to step S32.

In step S30, the CPU 32 executes the function designated by the execution request.

When the scanning function is designated, the CPU 32 allows the scanning execution unit 18 to read a document to generate scan data, and transmits the generated scan data to the target terminal using the WFDNW via the wireless LAN I/F 22. When the printing function is designated, the CPU 32 provides print data received along with the execution request to the printing execution unit 16 and allows the printing execution unit 16 to print an image represented by the print data. Subsequent to step S30, the CPU 32 deletes the MAC address of the target terminal from the WFD management list. That is, the CPU 32 excludes the target terminal from the WFDNW and terminates the belonging situation. Subsequently, the CPU 32 ends the function execution process of FIG. 3.

In step S32, the CPU 32 transmits an NG notification to the target terminal using the WFDNW via the wireless LAN I/F 22. The NG notification indicates that the authentication is failed. Subsequent to step S32, the CPU 32 deletes the MAC address of the target terminal from the WFD management list. That is, the CPU 32 excludes the target terminal from the WFDNW and terminates the belonging situation. Subsequently, the CPU 32 ends the function execution process of FIG. 3.

Figure 4:
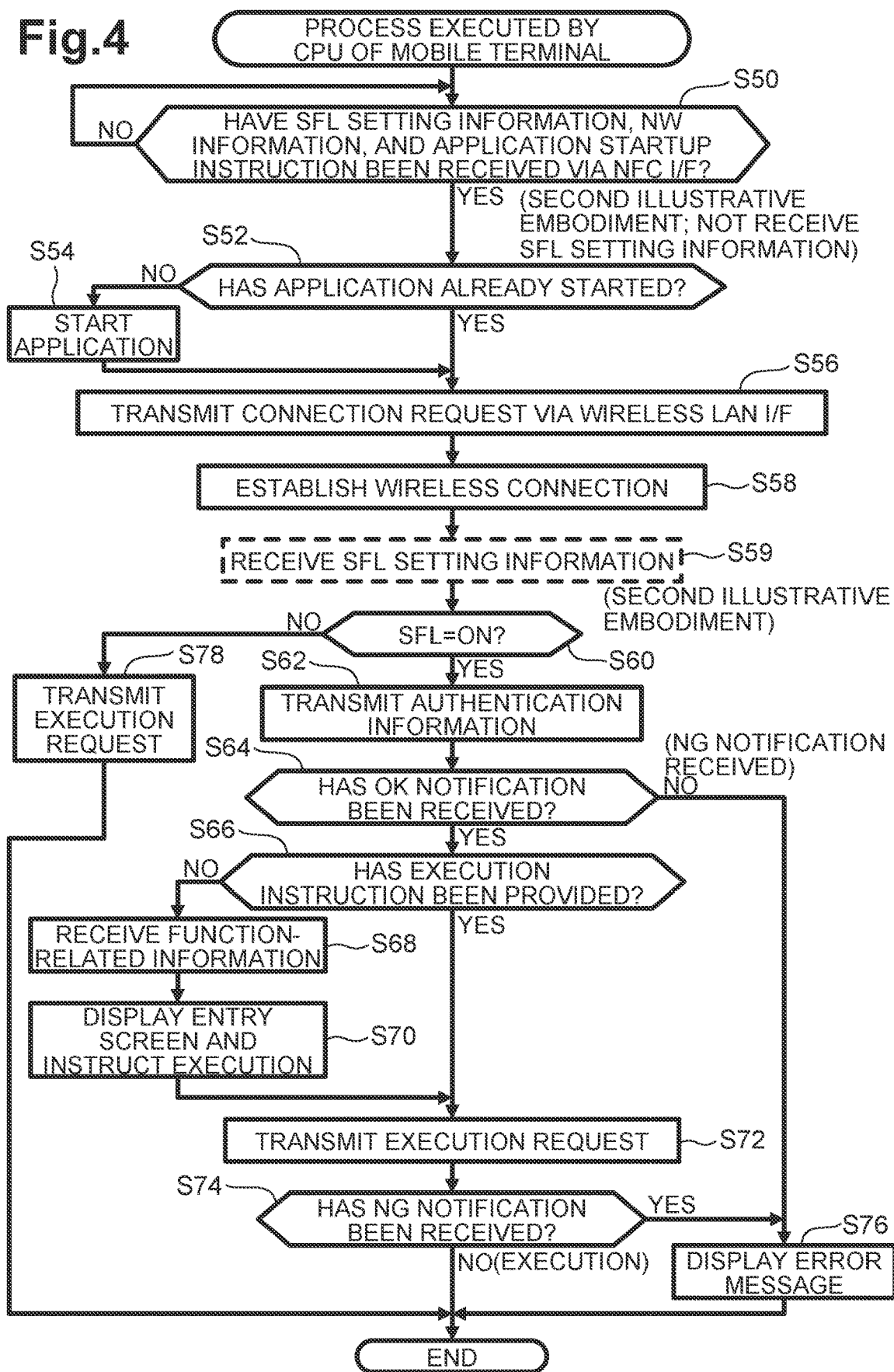
FIG. 4 is a flowchart depicting an example process executed by a CPU of a mobile terminal in the first illustrative embodiment according to one or more aspects of the disclosure.

Referring to FIG. 4, a detail of a process executed by the CPU 92 of the mobile terminal PT1 will be described below. Processes executed by the CPUs of the mobile terminals PT2 and PT3, respectively, may be substantially the same as the process of FIG. 4 executed by the CPU 92 of the mobile terminal PT1. As the power of the mobile terminal PT1 is turned on, the CPU 92 starts the process of FIG. 4.

In step S50, the CPU 92 monitors receipt of SFL setting information, network information, and an application startup instruction via the NFC I/F 80. When the user of the mobile terminal PT1 requests the MFP 10 to execute a particular function (e.g., the printing function), the user brings the mobile terminal PT1 closer to the MFP 10. At this point, the operation for staring the application 98 for the MFP 10 and the operation for designating the particular function may or might not have been performed on the operation unit 72 of the mobile terminal PT1. The NFC I/F 80 of the mobile terminal PT1 operates in the Reader mode. As a distance between the NFC I/F 80 of the mobile terminal PT1 and the IC tag I/F 20 of the MFP 10 becomes a certain distance or shorter in which NFC communication can be performed therebetween (e.g., approximately 10 cm), an NFC communication session is established therebetween. In this case, the CPU 92 reads the SFL setting information, network information, and application startup instruction stored in the interface memory 21 of the IC tag I/F 20 using the established communication session via the NFC I/F 80. That is, the CPU 92 receives the SFL setting information, the network information, and the application startup instruction. Upon receipt of the SFL setting information, the network information, and the application startup instruction, the CPU 92 makes a positive determination (e.g., YES) in step S50, and the routine proceeds to step S52.

In step S52, the CPU 92 determines whether the application 98 for MFP 10 has already started. When the CPU 92 determines that the application 98 for MFP 10 has already started, the CPU 92 makes a positive determination (e.g., YES) in step S52, and the routine proceeds to step S56. When the CPU 92 determines that the application 98 for MFP 10 has not started yet at this point, the CPU 92 makes a negative determination (e.g., NO) in step S52, and the routine proceeds to step S54. In step S54, the CPU 92 starts the application 98. Upon completion of the processing in step S54, the routine proceeds to step S56.

In step S56, the CPU 92 transmits a connection request (more specifically, a Probe Request) to the MFP 10 via the wireless LAN I/F 82. The connection request includes the received SSID (e.g., the network information).

In step S58, the CPU 92 executes processing for establishing wireless connection in conjunction with the MFP 10 to establish wireless connection between the MFP 10 and the target terminal. More specifically, the CPU 92 transmits a connection request to the MFP 10 and receives a Probe Response from the MFP 10 in response to the connection request. Subsequently, the CPU 92 transmits an Authentication Request and an Association Request sequentially to the MFP 10 and receives an Authentication Response and an Association Response sequentially from the MFP 10. Through this step, it is determined whether the network information stored in the NW information storage area of the memory 34 of the MFP 10 matches the network information received by the target terminal. Then, the CPU 92 executes a four-way handshake with the MFP 10.

Upon completion of the above processes, wireless connection is established between the MFP 10 and the target terminal. Thus, the mobile terminal PT1 is permitted to participate in the WFDNW configured by the MFP 10, as a slave (e.g., as a CL-status device), whereby a belonging situation in which both the MFP 10 and the target terminal belong in the same WFDNW is established.

In step S60, the CPU 92 determines whether the SFL of the MFP 10 is "ON" (SFL=ON). Processing of step S59 in FIG. 4 may be executed in the second illustrative embodiment but might not be executed in the first illustrative embodiment. When the CPU 92 determines that the SFL setting information 38 stored in the memory 34 indicates "ON", the CPU 92 makes a positive determination (e.g., YES) in step S60, and the routine proceeds to step S62. When the CPU 92 determines that the SFL setting information 38 stored in the memory 34 indicates "OFF", the CPU 92 makes a negative determination (e.g., NO) in step S60, and the routine proceeds to step S78.

In step S78, the CPU 92 transmits, to the MFP 10, an execution request for execution of one of the plurality of function (e.g., the printing function and the scanning function) of the MFP 10, using the WFDNW, via the wireless LAN I/F 82. At this point, when the execution instruction has already been provided by the user through the operation unit 72 of the mobile terminal PT1, in step S78, the CPU 92 transmits the execution request including the particular function designated by the user to the MFP 10. The detail of the execution request is as described above. When the execution instruction has not yet been provided by the user, the CPU 92 displays, on the display unit 74, an entry screen prompting the user to provide an execution instruction. As the user provides an execution instruction with designating a particular function, the CPU 92 transmits an execution request to the MFP 10. Upon completion of the processing in step S78, the CPU 92 ends the process of FIG. 4. In this case, the particular function is executed by the MFP 10.

In step S62, the CPU 92 transmits, to the MFP 10, the authentication information (e.g., the user ID (e.g., "U1") and the password (e.g., "P1")) stored in the memory 94, using the WFDNW via the wireless LAN I/F 82.

In step S64, the CPU 92 determines whether an OK notification has been received from the MFP 10. When authentication is executed using the received authentication information and the authentication is successful, the MFP 10 transmits an OK notification to the mobile terminal PT1 (e.g., step S20 in FIG. 3). Upon receipt of the OK notification from the MFP 10 using the WFDNW via the wireless LAN I/F 82, the CPU 92 makes a positive determination (e.g., YES) in step S64, and the routine proceeds to step S66. When the authentication is failed, the MFP 10 transmits an NG notification to the mobile terminal PT1. Upon receipt of the NG notification from the MFP 10 using the WFDNW via the wireless LAN I/F 82, the CPU 92 makes a negative determination (e.g., NO) in step S64, and the routine proceeds to step S76.

In step S66, the CPU 92 determines whether the execution instruction has been provided. When the execution instruction has already been provided by the user at the time of the determination in step S66, the CPU 92 makes a positive determination (e.g., YES) in step S66, the routine proceeds to step S72. When the execution instruction has not yet been provided at the time of the determination in step S66, the CPU 92 makes a negative determination (e.g., NO) in step S66, and the routine proceeds to step S68.

In step S68, the CPU 92 receives function related information from the MFP 10 using the WFDNW via the wireless LAN I/F 82. As described above, when the MFP 10 does not receive an execution request from the mobile terminal PT1 within the predetermined time period (e.g., five seconds) after transmitting the OK notification, the MFP 10 transmits function related information to the mobile terminal PT1 (e.g., step S24 in FIG. 3). In step S68, the CPU 92 receives the function related information.

In step S70, the CPU 92 displays, on the display unit 74, an entry screen for allowing the user to provide an execution instruction, in accordance with the received function related information. The entry screen notifies the user that the user is allowed to select the function that is available based on the function related information. For example, when the function related information includes "PRINTING=NG" and "SCANNING=OK", the entry screen displays a message indicating that only the scanning function of the MFP 10 is available to the user. The user is allowed to input an execution instruction through the entry screen. Upon input of the execution instruction, the routine proceeds to step S72.

In step S72, the CPU 92 transmits an execution request to the MFP 10 using the WFDNW via the wireless LAN I/F 82. The execution request includes information indicating the function designated by the user in the execution instruction. When the function designated by the user is the printing function, in step S72, the CPU 92 transmits print data to the MFP 10 along with the execution request.

In step S74, the CPU 92 determines whether an NG notification has been received from the MFP 10 within the predetermined time period after transmitting the execution request in step S72. Upon receipt of the execution request, the MFP 10 determines whether the function designated by the execution request is available to the user (e.g., step S28 in FIG. 3). When MFP 10 determines that the function designated by the execution request is available to the user, the MFP 10 executes the requested particular function. In this case, the MFP 10 does not transmit an NG notification. Therefore, the CPU 92 makes a negative determination (e.g., NO) in step S74, the CPU 92 ends the process of FIG. 4. When the MFP 10 determines that the function designated by the execution request is not available to the user, the MFP 10 transmits an NG notification to the mobile terminal PT1. In this case, the CPU 92 makes a positive determination (e.g., YES) in step S74, and the routine proceeds to step S76.

In step S76, the CPU 92 displays an error message on the display unit 74. Upon completion of the processing in step S76, the CPU 92 ends the process of FIG. 4.

Referring to FIGS. 5, 6, and 7, various example cases implemented by the flowcharts of FIGS. 2, 3, and 4 will be described.

Referring to FIG. 5, Case A1 will be described below. Example communication that may be performed between the MFP 10 and the mobile terminal PT1 when an NFC connection is established therebetween while the SFL of the MFP 10 is "ON" will be described below.

As the power of the MFP 10 is turned on, the MFP 10 starts serving as a G/O-status device. That is, a WFDNW in which the MFP 10 serves as a master is configured (e.g., step S2 in FIG. 2). In Case A1, the SFL of the MFP 10 is "ON" (i.e., the SFL setting information 38 indicates "ON").

In T10, the CPU 32 of the MFP 10 stores the SFL setting information indicating that the SFL is "ON", the network information, and the application startup instruction, into the IC tag I/F 20. Hereinafter, the SFL setting information indicating that the SFL is "ON" is also referred to as "SFL setting information (SFL=ON)".

As the power of the mobile terminal PT1 is on, the NFC I/F 80 starts operating in a state where the Reader mode is active and the other modes are inactive. In T12, the user of the mobile terminal PT1 performs an application startup operation and then an execution instruction to designate a particular function by operating the operation unit 72 of the mobile terminal PT1.

Subsequently, the user of the mobile terminal PT1 brings the mobile terminal PT1 closer to the MFP 10. As a distance between the NFC I/F 80 of the mobile terminal PT1 and the IC tag I/F 20 of the MFP 10 becomes a certain distance or shorter in which NFC communication can be performed therebetween (e.g., approximately 10 cm), an NFC connection (e.g., an NFC communication session) is established therebetween (e.g., T14).

In T16, the IC tag I/F 20 of the MFP 10 transmits SFL setting information (SFL=ON), network information, and an application startup instruction to the mobile terminal PT1 using the established NFC communication session.

That is, in T16, the CPU 92 of the mobile terminal PT1 receives the SFL setting information (SFL=ON), the network information, and the application startup instruction from the IC tag I/F 20 using the NFC communication session via the NFC I/F 80 (e.g., YES in step S50 in FIG. 4).

In T18, the CPU 92 of the mobile terminal PT1 transmits a connection request to the MFP 10 via the wireless LAN I/F 82 (e.g., step S56 in FIG. 4). The connection request includes the network information (more specifically, the SSID) received by the mobile terminal PT1.

In T20, the CPU 32 of the MFP 10 executes the predetermined processing for establishing connection in conjunction with the mobile terminal PT1 to establish wireless connection between the MFP 10 and the mobile terminal PT1 (e.g., step S12 in FIG. 3 and step S58 in FIG. 4), whereby a belonging situation in which both the MFP 10 and the mobile terminal PT1 belong in the same WFDNW is established.

In T22, the CPU 92 of the mobile terminal PT1 transmits authentication information (e.g., the user ID (e.g., "U1") and a password (e.g., "P1")) to the MFP 10 using the WFDNW via the wireless LAN I/F 22 (e.g., step S62 in FIG. 4).

Upon receipt of the authentication information, the CPU 32 of the MFP 10 executes authentication (e.g., step S18 in FIG. 3). As depicted in FIG. 1, the SFL table 40 includes the combined information including "USER ID=U1" and "PASSWORD=P1". Therefore, in T24, the CPU 32 determines that the authentication is successful (e.g., the CPU 32 determines that makes a positive determination (e.g., YES) in step S18 in FIG. 3). In T26, the CPU 32 transmits an OK notification to the mobile terminal PT1 using the WFDNW via the wireless LAN I/F 22 (e.g., step S20 in FIG. 3).

The CPU 92 of the mobile terminal PT1 receives the OK notification. When the execution instruction provided by the user (e.g., T12) is the execution instruction for execution of the printing function, the CPU 92 transmits, to the MFP 10, print data and the execution instruction for execution of the printing function, using the WFDNW via the wireless LAN I/F 82 (e.g., T28). Hereinafter, the execution instruction for execution of the printing function is also referred to as an "execution request (printing)".

Upon receipt of the execution request (printing) and the print data, the CPU 32 of the MFP 10 determines whether the printing function is available to the user of the mobile terminal PT1 (e.g., step S28 in FIG. 3). As depicted in FIG. 1, in the SFL table 40, the combined information including the "USER ID=U1" and "PASSWORD=P1" further includes "PRINTING=NG". Therefore, the CPU 32 determines that the printing function is not available to the user (e.g., NO in step S28 in FIG. 3) and thus do not execute the printing function (e.g., T30). In T32, the CPU 32 transmits an NG notification to the mobile terminal PT1 using the WFDNW via the wireless LAN I/F 22 (e.g., step S32 in FIG. 3).

In T34, the CPU 92 of the mobile terminal PT1 receives the NG notification and displays an error message on the display unit 74. Subsequently, the wireless connection between the MFP 10 and the mobile terminal PT1 is disconnected.

When the execution instruction provided by the user (T12) is the execution instruction for execution of the scanning function, the CPU 92 transmits an execution instruction for execution of the scanning function to the MFP 10 using the WFDNW via the wireless LAN I/F 22 after receiving the OK notification (T36). Hereinafter, the execution instruction for execution of the scanning function is also referred to as an "execution request (scanning)".

Upon receipt of the execution request (scanning), the CPU 32 of the MFP 10 determines whether the scanning function is available to the user of the mobile terminal PT1 (e.g., step S28 in FIG. 3). As depicted in FIG. 1, in the SFL table 40, the combined information including "USER ID=U1" and "PASSWORD=P1" further includes "SCANNING=OK". Therefore, the CPU 32 determines that the scanning function is available to the user (e.g., YES in step S28 in FIG. 3) and thus executes the scanning function (e.g., T38). In T40, the CPU 32 transmits generated scan data to the mobile terminal PT1 using the WFDNW via the wireless LAN I/F 22 (e.g., step S30 in FIG. 3). Subsequently, the wireless connection between the MFP 10 and the mobile terminal PT1 is disconnected.

There may be a case in which the SFL table 40 does not include the combined information including "USER ID=U1" and "PASSWORD=P1" (e.g., T22). In this case, in T42, the CPU 32 of the MFP 10 determines that the authentication is failed after receiving the authentication information (e.g., NO in step S18 in FIG. 3). Subsequent to T42, in T44, the CPU 32 transmits an NG notification to the mobile terminal PT1 using the WFDNW via the wireless LAN I/F 22 (e.g., step S32 in FIG. 3).

In T46, the CPU 92 of the mobile terminal PT1 receives the NG notification and displays an error message on the display unit 74. Subsequently, the wireless connection between the MFP 10 and the mobile terminal PT1 is disconnected.

Effects of Case A1 will be described below. As described above, in Case A1, the IC tag I/F 20 of the MFP 10 transmits the SFL setting information (SFL=ON), the network information, and the application startup instruction to the mobile terminal PT1 using the NFC communication session (e.g., T16). Subsequently, the belonging situation in which both the MFP 10 and the mobile terminal PT1 belong in the same WFDNW is established (e.g., T18 and T20). When the belonging situation is established, the mobile terminal PT1 transmits the authentication information (e.g., the user ID (e.g., "U1") and the password (e.g., "P12")) to the MFP 10 using the WFDNW (e.g., T22). In response to this, the MFP 10 executes authentication. More specifically, the MFP 10 determines whether the SFL table 40 includes the received authentication information. When the authentication is successful (e.g., T24) and the function designated by the execution request (e.g., the scanning function) is available to the user (e.g., T38), the MFP 10 executes the particular function. When the authentication is failed (e.g., T42), the MFP 10 does not execute the particular function. Therefore, according to the above-described configuration, the user of the mobile terminal PT1 who is able to transmit the authentication information listed on the SFL table 40 may be allowed to perform a particular function using the MFP 10. That is, an appropriate user of the mobile terminal PT1 may perform a desired function using the MFP 10. Therefore, in a case where the MFP 10 is allowed to perform communication with the communication terminal selectively via one of the IC tag I/F 20 and the wireless LAN I/F 22, the MFP 10 may execute the function requested by the user appropriately.

In Case A1, if the function designated by the execution request (e.g., the printing function) is not available to the user (e.g., T30) even when the authentication is successful (e.g., T24), the MFP 10 does not execute the particular function. Thus, the MFP 10 may execute the particular function appropriately.

In T16, the IC tag I/F 20 of the MFP 10 transmits the SFL setting information (SFL=ON), the network information, and the application startup instruction to the mobile terminal PT1 using the established NFC communication session. Therefore, the IC tag I/F 20 may transmit the SFL setting information (SFL=ON), the network information, and the application startup instruction appropriately to the mobile terminal PT1 without being controlled by the CPU 32.

Referring to FIG. 6, Case A2 will be described below. Another example communication that may be performed between the MFP 10 and the mobile terminal PT1 when an NFC connection is established therebetween while the SFL of the MFP 10 is "ON" will be described below. A situation in Case A2 may be different from the situation in Case A1 in a point that an application startup instruction and an execution instruction have not yet been provided through the mobile terminal PT1 at the time of establishment of NFC connection between the MFP 10 and the mobile terminal PT1.

As the power of MFP 10 is turned on, the MFP 10 starts serving as a G/O-status device. That is, a WFDNW in which the MFP 10 serves as a master is configured (e.g., step S2 in FIG. 2). In Case A2, the SFL of the MFP 10 is "ON" (i.e., the SFL setting information 38 indicates "ON").

Similar to Case A1, as the power of MFP 10 is turned on, the MFP 10 starts serving as a G/O-status device. That is, a WFDNW in which the MFP 10 serves as a master is configured (e.g., step S2 in FIG. 2). In T10, the CPU 32 of the MFP 10 stores SFL setting information (SFL=ON), network information, and an application startup instruction into the IC tag I/F 20.

At this point, the user of the mobile terminal PT1 has not performed the application startup operation nor provided the execution instruction yet. The user of the mobile terminal PT1 brings the mobile terminal PT1 having such a state closer to the MFP 10. As a distance between the NFC I/F 80 of the mobile terminal PT1 and the IC tag I/F 20 of the MFP 10 becomes a certain distance or shorter in which NFC communication can be performed therebetween (e.g., approximately 10 cm), an NFC connection (e.g., an NFC communication session) is established therebetween (e.g., T14).

In T16, the IC tag I/F 20 of the MFP 10 transmits the SFL setting information (SFL=ON), the network information, and the application startup instruction to the mobile terminal PT1 using the established NFC communication session. The CPU 92 of the mobile terminal PT1 receives the SFL setting information (SFL=ON), the network information, and the application startup instruction.

In Case A2, in T17, the CPU 92 of the mobile terminal PT1 starts the application 98 (see FIG. 1) in response to the received application startup instruction (e.g., step S54 in FIG. 4). After starting application 98, the CPU 92 transmits a connection request to the MFP 10 via the wireless LAN I/F 82 (e.g., T18).

Processing executed in T20, T22, T24, and T26 in Case A2 may be substantially the same as the processing executed in T20, T22, T24, and T26, respectively, in Case A1 (see FIG. 5), and therefore, a detailed description for such processing will be omitted.

In Case A2, since the execution instruction has not yet been provided through the mobile terminal PT1, the CPU 92 of the mobile terminal PT1 does not transmit an execution request to the MFP 10 even when the CPU 92 receives the OK notification (e.g., T26).

Therefore, in T50, the CPU 32 of the MFP 10 transmits function related information associated with the authentication information including "USER ID=U1" and "PASSWORD=P1", to the mobile terminal PT1 using the WFDNW via the wireless LAN I/F 22 (e.g., NO in step S22 in FIG. 2 and step S24). That is, the CPU 32 of the MFP 10 transmits, to the mobile terminal PT1, the function related information including "PRINTING=NG" and "SCANNING=OK" associated with the authentication information including "USER ID=U1" and "PASSWORD=P1".

In T52, the CPU 92 of the mobile terminal PT1 receives the function related information and displays an entry screen on the display unit 74. The entry screen displays, for example, a message indicating that the scanning function is available to the user. Nevertheless, the entry screen might not display a message indicating that the printing function is not available to the user. In T54, the user provides an execution instruction for execution of the scanning function through the entry screen. In T56, the CPU 92 transmits an execution request (scanning) using the WFDNW via the wireless LAN I/F 82.

Upon receipt of the execution request (scanning), the CPU 32 of the MFP 10 determines whether the scanning function is available to the user of the mobile terminal PT1 (e.g., step S28 in FIG. 3). As depicted in FIG. 1, in the SFL table 40, the combined information including "USER ID=U1" and "PASSWORD=P1" further includes "SCANNING=OK". Therefore, the CPU 32 determines that the scanning function is available to the user (e.g., YES in step S28 in FIG. 3) and executes the scanning function (e.g., T58). In T60, the CPU 32 transmits generated scan data to the mobile terminal PT1 using the WFDNW via the wireless LAN I/F 22 (e.g., step S30 in FIG. 3). Subsequently, the wireless connection between the MFP 10 and the mobile terminal PT1 is disconnected.

Effects of Case A2 will be described below. As described above, in Case A2, in T17, the CPU 92 of the mobile terminal PT1 starts the application 98 (see FIG. 1) in response to the received application startup instruction (e.g., step S54 in FIG. 4). Therefore, when the application 98 has not started yet on the mobile terminal PT1, the MFP 10 may enable the mobile terminal PT1 to start the application 98 appropriately. The mobile terminal PT1 may also start the application 98 appropriately even when the application 98 has not yet started.

In T52, the CPU 92 of the mobile terminal PT1 receives the function related information and displays the entry screen on the display unit 74. The entry screen displays, for example, a message indicating that the scanning function is available to the user but might not display a message indicating that the printing function is not available to the user. Therefore, the user may provide the execution instruction through the entry screen appropriately and the mobile terminal PT1 may transmit the execution request to the MFP 10 appropriately. Furthermore, the MFP 10 may execute the function requested by the user appropriately.

Referring to FIG. 7, Case A3 will be described below. Example communication that may be performed between the MFP 10 and the mobile terminal PT1 when an NFC connection is established therebetween while the SFL of the MFP 10 is "OFF" will be described below.

As the power of MFP 10 is turned on, the MFP 10 starts serving as a G/O-status device. That is, a WFDNW in which the MFP 10 serves as a master is configured (e.g., step S2 in FIG. 2). In Case A3, the SFL of the MFP 10 is "OFF" (i.e., the SFL setting information 38 indicates "OFF").

In Case A3, in T70, the CPU 32 of the MFP 10 stores the SFL setting information indicating that the SFL is "OFF", the network information, and the application startup instruction, into the IC tag I/F 20. Hereinafter, the SFL setting information indicating that the SFL is "OFF" is also referred to as "SFL setting information (SFL=OFF)".

Processing executed in T12 and T14 in Case A3 may be substantially the same as the processing executed in T12 and T14, respectively, in Case A1 (see FIG. 5), and therefore, a detailed description for such processing will be omitted. In Case A3, the execution instruction provided by the user (e.g. T12) may be an execution instruction for execution of the printing function.

In T76, the IC tag I/F 20 of the MFP 10 transmits the SFL setting information (SFL=OFF), the network information, and the application startup instruction to the mobile terminal PT1 using the established NFC communication session. The CPU 92 of the mobile terminal PT1 receives the SFL setting information (SFL=OFF), the network information, and the application startup instruction.

Processing executed in T18 and T20 in Case A3 may be substantially the same as the processing executed in T18 and T20, respectively, in Case A1 (see FIG. 5), and therefore, a detailed description for such processing will be omitted.

In Case A3, the SFL of the MFP 10 is "OFF". Therefore, the mobile terminal PT1 does not transmit any authentication information to the MFP 10 (e.g., NO in step S60 in FIG. 4). In T82, the CPU 92 of the mobile terminal PT1 transmits an execution request (printing) and print data to the MFP 10 using the WFDNW via the wireless LAN I/F 82 (e.g., step S78 in FIG. 4).

In Case A3, the SFL of the MFP 10 is "OFF". Therefore, in T84, upon receipt of the execution request (printing) and the print data, the CPU 32 of the MFP 10 executes the printing function (e.g., step S30 in FIG. 3). Subsequently, the wireless connection between the MFP 10 and the mobile terminal PT1 is disconnected.

Effects of Case A3 will be described below. In contrast to Cases A1 and A2, the SFL is "OFF" in Case A3. In Case A3, when the belonging situation is established, the mobile terminal PT1 transmits an execution request to the MFP 10 (e.g., T82) without transmitting any authentication information to the MFP 10. Further, the MFP 10 executes the function requested by the user (e.g., T84) without executing authentication. That is, the mobile terminal PT1 may determine whether the mobile terminal PT1 transmits authentication information depending on whether the SFL of the MFP 10 is "ON". Further, the MFP 10 may determine whether the MFP 10 executes authentication depending on whether the SFL of the MFP 10 is "ON". Therefore, the mobile terminal PT1 and the MFP 10 may operate appropriately depending on whether the SFL is "ON".

The MFP 10 may be an example of a "function execution device". The mobile terminal PT1 may be an example of a "communication terminal". The NFC communication protocol may be an example of a "first communication protocol". The WFD communication protocol may be an example of a "second communication protocol". The IC tag I/F 20 may be an example of a "first device side interface (or a first interface)". The wireless LAN I/F 22 may be an example of a "second device side interface (or a second interface)". The IC tag I/F 20 may be an example of a "state information transmission portion". Each of the printing execution unit 16 and the scanning execution unit 18 may be an example of a "function execution portion". The function designated by the user in the execution instruction may be an example of a "particular function" and a "function". The WFDNW may be an example of a "particular wireless network" and a "wireless network". The authentication information (e.g., the "USER ID=U1" and "PASSWORD"=P1") may be an example of "particular authentication information" and "authentication information". The SFL setting information may be an example of "setting information". The SFL table 40 may be an example of a "list". In the SFL table 40, the availability information indicating that the printing function is available to the user associated with the user ID and password (e.g., "OK" or "NG") and the availability information indicating that the scanning function is available to the user (e.g., "OK" or "NG") may be an example of "function related information". The authentication executed in step S18 in FIG. 3 may be an example of "particular determination". The SFL setting information (SFL=ON) may be an example of "state information" and "authentication state information". The interface memory 21 of the IC tag I/F 20 may be an example of an "interface memory". The area for storing the SFL setting information 38 in the memory 34 may be an example of a "setting information memory". The NW information storage area of the memory 34 may be an example of a "device side memory". The NFC communication session may be an example of a "particular communication session".

The processing executed when a positive determination (e.g., "YES") is made in step S16 in FIG. 3 may be an example of processing executed by an "authentication-information reception portion". The processing executed in step S18 in FIG. 3 may be an example of processing executed by a "first determination portion". The processing executed in step S30 in FIG. 3 may be an example of processing executed by a "function control portion". The processing executed in steps S4 and S8 in FIG. 2 may be an example of processing executed by a "storage control portion". Each of the processing executed when a positive determination (e.g., "YES") is made in step S34 in FIG. 3 the processing executed when a positive determination (e.g., "YES") is made in step S22 in FIG. 3 may be an example of processing executed by an "execution-request reception portion". The processing executed in step S12 in FIG. 3 may be an example of processing executed by a "configuration portion". The processing executed in step S24 in FIG. 3 may be an example of processing executed by a "function related information transmission portion".

The NFC I/F 80 may be an example of a "first terminal side interface". The wireless LAN I/F 82 may be an example of a "second terminal side interface". The OK notification may be an example of "success information". The memory 94 may be an example of a "terminal side memory". The execution instruction provided by the user may be an example of a "predetermined instruction".

The processing executed when a positive determination (e.g., "YES") is made in step S50 in FIG. 4 may be an example of processing executed by a "network-information reception portion". The processing executed in step S58 in FIG. 4 may be another example of processing executed by the "configuration portion". The processing executed in step S62 in FIG. 4 may be an example of processing executed by an "authentication-information transmission portion". Each of the processing executed in step S78 in FIG. 4 and the processing executed in step S72 in FIG. 4 may be an example of processing executed by an "execution-request transmission portion". The processing of receiving the SFL setting information (SFL=ON) when a positive determination (e.g., "YES") is made in step S50 in FIG. 4 may be an example of processing executed by a "state information reception portion". The processing executed when a positive determination (e.g., "YES") is made in step S64 in FIG. 4 may be an example of processing executed by a "success information reception portion". The processing executed in step S70 in FIG. 4 may be an example of processing executed by a "display control portion". The processing executed in step S68 in FIG. 4 may be an example of processing executed by a "function related information reception portion". The processing executed in step S54 in FIG. 4 may be an example of processing executed by a "startup portion".

Hereinafter, a second illustrative embodiment will be described mainly with different points from the first illustrative embodiment. In the second illustrative embodiment, the IC tag I/F 20 of the MFP 10 includes the interface memory 21 whose contents cannot be changed by the CPU 32, and the IC tag I/F 20 is not connected to the bus. The second illustrative embodiment may be further different from the first illustrative embodiment in a point that the CPU 32 is not permitted to change the information stored in the IC tag I/F 20 of the MFP 10. In the second illustrative embodiment, network information including the predetermined SSID, the password, the authentication method, and the encryption method is stored in the interface memory 21 of the IC tag I/F 20 of the MFP 10. The application startup instruction is also stored in the interface memory 21 of the IC tag I/F 20 as well as the network information. Nevertheless, in the second illustrative embodiment, the SFL setting information is not stored in the interface memory 21 of the IC tag I/F 20. Therefore, in the second illustrative embodiment, processing executed in each step by the CPU 32 of the MFP 10 (see FIGS. 2 and 3) and part of processing executed in each step by the CPU 92 of the mobile terminal PT1 (see FIG. 4) may be different from the processing executed in a corresponding step in the first illustrative embodiment.

Referring to FIG. 2, an interface control process executed by the CPU 32 of the MFP 10 according to the second illustrative embodiment will be described. In the second illustrative embodiment, as the power of MFP 10 is turned on, the CPU 32 also executes the interface control process of FIG. 2.

In step S2, the CPU 32 changes the operating status of the MFP 10 from the device status, which is the default status, to the G/O status. Thus, in the second illustrative embodiment, also, the MFP 10 serves as a G/O-status device. That is, a WFDNW in which the MFP 10 serves as a master is configured. Nevertheless, in the second illustrative embodiment, the CPU 32 does not generate a new SSID and password in step S2. In the second illustrative embodiment, the CPU 32 configures a WFDNW using the SSID and password that are the same as the SSID and password stored in the IC tag I/F 20.

In the illustrative embodiment, the CPU 32 ends the interface control process of FIG. 2 without executing the processing in steps S4, S6, and S8.

Referring to FIG. 3, a function execution process executed by the CPU 32 of the MFP 10 according to the second illustrative embodiment will be described. The detail of the function execution process (see FIG. 3) according to the third illustrative embodiment may be basically substantially the same as the detail of the function execution process according to the first illustrative embodiment. Nevertheless, the second illustrative embodiment may be different from the first illustrative embodiment in a point that, in step S13, the CPU 32 transmits the SFL setting information to the target terminal using the WFDNW via the wireless LAN I/F 22 after wireless connection is established between the MFP 10 and the target terminal in step S12. As described above, in the second illustrative embodiment, no SFL setting information is stored in the IC tag I/F 20. Thus, after a belonging situation in which both the MFP 10 and the target terminal belong in the same WFDNW is established (e.g., step S12), in step S13, the CPU 32 transmits SFL setting information to the target terminal with reference to the SFL setting information 38 (e.g., "ON" or "OFF") stored in the memory 34. Therefore, the target terminal may obtain whether the SFL of the MFP 10 is "ON".

The process executed by the CPU 92 of the mobile terminal PT1 according to the second illustrative embodiment (see FIG. 4) may also basically substantially the same as the detail of the process executed by the CPU 92 of the mobile terminal PT1 according to the first illustrative embodiment. Nevertheless, the second illustrative embodiment may be different from the first illustrative embodiment in a point that, in step S59, the CPU 92 receives the SFL setting information from the MFP 10 using the WFDNW via the wireless LAN I/F 22 after wireless connection is established between the MFP 10 and the target terminal in step S58. In the second illustrative embodiment, no SFL setting information is stored in the IC tag I/F 20. Therefore, in this regard, the second illustrative embodiment may be different from the first illustrative embodiment similar to the function execution process (see FIG. 3).

Referring to FIG. 8, Case B will be described below. In the second illustrative embodiment, example communication that may be performed between the MFP 10 and the mobile terminal PT1 when an NFC connection is established therebetween while the SFL of the MFP 10 is "ON" will be described below.

As the power of the MFP 10 is turned on, the MFP 10 starts serving as a G/O-status device. That is, a WFDNW in which the MFP 10 serves as a master is configured (e.g., step S2 in FIG. 2). In Case B, the SFL of the MFP 10 is "ON" (i.e., the SFL setting information 38 indicates "ON"). In Case B, change of the contents stored in the interface memory 21 of the IC tag I/F 20 is not permitted (i.e., the processing corresponding to the processing executed in T10 in Case A1 (see FIG. 5) is not executed). In Case B, the predetermined network information and the application startup instruction are stored in the interface memory 21 of the IC tag I/F 20.

Processing executed in T112 and T114 in Case B may be substantially the same as the processing executed in T12 and T14, respectively, in Case A1 (see FIG. 5), and therefore, a detailed description for such processing will be omitted.

In T116, the IC tag I/F 20 of the MFP 10 transmits the network information and the application startup instruction that are stored in the memory to the mobile terminal PT1 using the established NFC communication session.

That is, in T116, the CPU 92 of the mobile terminal PT1 receives the network information and the application startup instruction from the IC tag I/F 20 using the NFC communication session via the NFC I/F 80 (e.g., YES in step S50 in FIG. 4).

Processing executed in T118 and T120 in Case B may be substantially the same as the processing executed in T18 and T20, respectively, in Case A1 (see FIG. 5), and therefore, a detailed description for such processing will be omitted.

In Case B, when a belonging situation is established, in T121, the CPU 32 of the MFP 10 transmits SFL setting information (SFL=ON) to the mobile terminal PT1 using the WFDNW via the wireless LAN I/F 22 (e.g., step S13 in FIG. 3 or step S59 in FIG. 4).

Subsequent processing executed in T122 to T146 in Case B may be substantially the same as the processing executed in T22 to T46, respectively, in Case A1 (see FIG. 5).

Effects obtained according to the second illustrative embodiment will be described. In the second illustrative embodiment, the predetermined network information and the application startup instruction are stored in the IC tag I/F 20. Further, the contents of the interface memory 21 of the IC tag I/F 20 cannot be changed. In the second illustrative embodiment, as a belonging situation is established, the CPU 32 of the MFP 10 transmits the SFL setting information (SFL=ON) to the mobile terminal PT1 using the WFDNW via the wireless LAN I/F 22 (e.g., step S13 in FIG. 3 or step S59 in FIG. 4). Therefore, the MFP 10 may transmit the SFL setting information (SFL=ON) to the mobile terminal PT1 appropriately. The mobile terminal PT1 may appropriately obtain whether the SFL of the MFP 10 is "ON".

The processing executed in step S13 in FIG. 3 may be another example of processing executed by the "state information transmission portion". The processing executed in step S59 in FIG. 4 may be another example of processing executed by the "state information reception portion".

Hereinafter, a third illustrative embodiment will be described mainly with different points from the first illustrative embodiment. As depicted in FIGS. 9 and 10, according to the third illustrative embodiment, communication performed between the MFP 10 and the mobile terminal PT1 when NFC connection is established between the MFP and one of the mobile terminal PT1 and the mobile terminal PT2 while the SFL of the MFP 10 is "ON" may be different from the communication performed in the same situation according to the first illustrative embodiment. More specifically, the third illustrative embodiment may be different from the first illustrative embodiment in a point that when it is determined the SFL of the MFP 10 is "ON" after a belonging situation is established, one of the mobile terminal PT1 and the mobile terminal PT2 transmits authentication information and an execution request to the MFP 10 before the MFP 10 executes authentication using the received authentication information. Referring to FIGS. 9 and 10, example communication performed in Cases C1 and C2 will be described below.

Processing executed in T210 to T220 in FIG. 9 in Case C1 may be substantially the same as the processing executed in T10 to T20, respectively, in Case A1 (see FIG. 5), and therefore, a detailed description for such processing will be omitted.

When the execution instruction provided by the user (e.g., T212) is the execution instruction for execution of the printing function, in T222, the CPU 92 of the mobile terminal PT1 transmits the authentication information (e.g., the user ID (e.g., "U1") and the password (e.g., "P1")), an execution request (printing), and print data to the MFP 10 using the WFDNW via the wireless LAN I/F 82.

Upon receipt of the authentication information, the execution request (printing), and the print data, the CPU 32 of the MFP 10 executes authentication (e.g., step S18 in FIG. 3). As depicted in FIG. 1, the SFL table 40 includes the combined information including "USER ID=U1" and "PASSWORD=P1". Thus, in T224, the CPU 32 determines that the authentication is successful (e.g., the CPU 32 makes a positive determination (e.g., YES) in step S18 in FIG. 3).

In T226, the CPU 32 determines whether the printing function is available to the user of the mobile terminal PT1 (e.g., step S28 in FIG. 3). As depicted in FIG. 1, in the SFL table 40, the combined information including "USER ID=U1" and "PASSWORD=P1" further includes "PRINTING=NG". Therefore, the CPU 32 determines that the printing function is not available to the user and thus does not execute the printing function. In T228, the CPU 32 transmits an NG notification to the mobile terminal PT1 using the WFDNW via the wireless LAN I/F 22 (e.g., step S32 in FIG. 3).

In T230, the CPU 92 of the mobile terminal PT1 receives the NG notification and displays an error message on the display unit 74. Subsequently, the wireless connection between the MFP 10 and the mobile terminal PT1 is disconnected.

When the execution instruction provided by the user (e.g., T212) is the execution instruction for execution of the scanning function, instead of performing T222, in T250, the CPU 92 of the mobile terminal PT1 transmits the authentication information (e.g., the user ID (e.g., "U1") and the password (e.g., "P1")) and an execution request (scanning) to the MFP 10 using the WFDNW via the wireless LAN I/F 82.

Upon receipt of the authentication information and the execution request (scanning), the CPU 32 of the MFP 10 executes authentication (e.g., step S18 in FIG. 3). Similar to T224, in T252, the CPU 32 determines that the authentication is successful.

In T254, the CPU 32 determines whether the scanning function is available to the user of the mobile terminal PT1 (e.g., step S28 in FIG. 3). As depicted in FIG. 1, in the SFL table 40, the combined information including "USER ID=U1" and "PASSWORD=P1" further includes "SCANNING=OK". Therefore, the CPU 32 determines that the scanning function is available to the user and thus executes the scanning function. In T256, the CPU 32 transmits generated scan data to the mobile terminal PT1 using the WFDNW via the wireless LAN I/F 22. Subsequently, the wireless connection between the MFP 10 and the mobile terminal PT1 is disconnected.

There may be a case in which the SFL table 40 does not include the combined information including "USER ID=U1" and "PASSWORD"=P1" (e.g., T22). In this case, in T240, the CPU 32 of the MFP 10 determines that the authentication is failed (e.g., NO in step S18 in FIG. 3). In T242, the CPU 32 transmits an NG notification to the mobile terminal PT1 using the WFDNW via the wireless LAN I/F 22 (e.g., step S32 in FIG. 3).

In T244, the CPU 92 of the mobile terminal PT1 receives the NG notification and displays an error message on the display unit 74. Subsequently, the wireless connection between the MFP 10 and the mobile terminal PT1 is disconnected.

Referring to FIG. 10, Case C2 will be described below. A situation in Case A2 may be different from the situation in Case C1 in a point that NFC connection is established between the MFP 10 and the mobile terminal PT2 while the SFL of the MFP 10 is "ON". Processing executed in T270 to T280 in Case C2 may be substantially the same as the processing executed in T210 to T220, respectively, in Case C1 (see FIG. 9), and therefore, a detailed description for such processing will be omitted.

When the execution instruction provided by the user (e.g., T272) is the execution instruction for execution of the printing function, in T282, the CPU of the mobile terminal PT2 transmits the authentication information (e.g., the user ID (e.g., "U2") and the password (e.g., "P2")), an execution request (printing), and print data to the MFP 10 using the WFDNW via the wireless LAN I/F (not depicted).

Upon receipt of the authentication information, the execution request (printing), and the print data, the CPU 32 of the MFP 10 executes authentication (e.g., step S18 in FIG. 3). As depicted in FIG. 1, the SFL table 40 includes the combined information including "USER ID=U2" and "PASSWORD=P2". Thus, in T284, the CPU 32 determines that the authentication is successful (e.g., the CPU 32 makes a positive determination (e.g., YES) in step S18 in FIG. 3).

In T286, the CPU 32 determines whether the printing function is available to the user of the mobile terminal PT2 (e.g., step S28 in FIG. 3). As depicted in FIG. 1, in the SFL table 40, the combined information including "USER ID=U2" and "PASSWORD=P2" further includes "PRINTING=OK". Therefore, the CPU 32 determines that the printing function is available to the user and thus executes the printing function. Subsequently, the wireless connection established between the MFP 10 and the mobile terminal PT2 is disconnected.

When the execution instruction provided by the user (e.g., T272) is the execution instruction for execution of scanning function, instead of performing T282, in T290, the CPU of the mobile terminal PT2 transmits authentication information (e.g., the user ID (e.g., "U2") and the password (e.g., "P2")) and an execution request (scanning) to the MFP 10 using the WFDNW via the wireless LAN I/F (not depicted).

Upon receipt of the authentication information and the execution request (scanning), the CPU 32 of the MFP 10 executes authentication (e.g., step S18 in FIG. 3). Similar to T284, in T292, the CPU 32 determines that the authentication is successful.

In T294, the CPU 32 determines whether the scanning function is available to the user of the mobile terminal PT2 (e.g., step S28 in FIG. 3). As depicted in FIG. 1, in the SFL table 40, the combined information including "USER ID=U2" and "PASSWORD=P2" further includes "SCANNING=NG". Therefore, the CPU 32 determines that the scanning function is not available to the user and thus does not execute the scanning function. In T296, the CPU 32 transmits an NG notification to the mobile terminal PT2 using the WFDNW via the wireless LAN I/F 22.

In T298, the CPU of the mobile terminal PT2 receives the NG notification and displays an error message on its display unit (not depicted). Subsequently, the wireless connection established between the MFP 10 and the mobile terminal PT2 is disconnected.

Effects obtained according to the third illustrative embodiment will be described below. As described above, in the third illustrative embodiment, after a belonging situation is established, one of the mobile terminal PT1 and the mobile terminal PT2 transmits a set of the authentication information and the execution request or a set of the authentication information, the execution request, and the print data, to the MFP 10. That is, one of the mobile terminal PT1 and the mobile terminal PT2 transmits the execution request to the MFP 10 before the MFP 10 executes authentication using the authentication information. In addition, when the execution request indicates execution of the printing function, one of the mobile terminal PT1 and the mobile terminal PT2 transmits the execution request and the print data to the MFP 10 before the MFP 10 executes authentication using the authentication information. When the MFP 10 determines that the authentication is successful and the function requested by the user is available to the user, the MFP 10 executes the particular function. In the third illustrative embodiment, when, the MFP 10 may operate appropriately in both the case in which the MFP 10 receives the execution request before executing authentication and the case in which the MFP 10 receives the set of the execution request and print data before executing authentication.

Each of the processing executed in T222 in FIG. 9 and the processing executed in T282 in FIG. 10 may be an example of processing executed by a "target-data transmission portion". Each of the processing executed in T222 in FIG. 9 and the processing executed in T282 in FIG. 10 may also be an example of processing executed by a "target-data reception portion". The print data may be an example of "target data".

Various embodiments of the disclosure have been described above; however, such embodiments are only examples and do not limit the scope of the appended claims. Examples of the modification and alternations of the above-described embodiment are described below.

In the above-described illustrative embodiments, the example cases in which the wireless connection using the WFD communication protocol is established between the MFP 10 and the target terminal (e.g., the mobile terminal PT1) are described (see FIGS. 5, 6, 7, 8, 9, and 10). Nevertheless, in other embodiments, for example, the MFP 10 and the target terminal may belong in a Wi-Fi network configured by an access point (not depicted) (hereinafter, referred to as an "AP"). That is, the MFP 10 may belong in the Wi-Fi network (hereinafter, referred to as a "Wi-FiNW") configured by the AP, as a slave (more specifically, as a station). In this case, a belonging situation in which both the MFP 10 and the target terminal belong in the Wi-FiNW configured by the AP may be established. The IC tag I/F 20 may transmit network information (e.g., an SSID and a password) to be used in the Wi-FiNW configured by the AP to the target terminal using an NFC communication session. In this variation, the Wi-FiNW configured by the AP may be another example of the "particular wireless network" and the "wireless network". The SSID and the password to be used in the Wi-FiNW configured by the AP may be another example of the "network information".

In the above-described illustrative embodiments, the MFP 10 includes the IC tag I/F 20 that is an NFC Forum tag. Nevertheless, in other embodiments, for example, the MFP 10 may include an NFC I/F that may be an NFC Forum device, instead of the IC tag I/F 20 that is an NFC Forum tag. In this case, as the power of MFP 10 is turned on, the NFC I/F of the MFP 10 may operate in the P2P mode. As the power of the target terminal is turned on, the NFC I/F of the target terminal (e.g., the NFC I/F 80 of the mobile terminal PT1) may also operate in the P2P mode. A P2P communication link may be established between the NFC I/F of the MFP 10 and the NFC I/F of the target terminal. In this case, the CPU 32 may be configured to transmit the SFL setting information, the network information, and the application startup instruction stored in the memory 34, to the target terminal using a communication session in the P2P communication link via the NFC I/F. That is, in this variation, the NFC I/F might not unnecessarily store the SFL setting information, and the network information in advance. In other variations, for example, another NFC communication session (e.g., a Reader mode—CE mode communication link) may be established between the NFC I/F of the MFP 10 and the NFC I/F of the target terminal, instead of the P2P communication link. In this case, the NFC I/F of the MFP 10 may be another example of the "first device side interface (or the first interface)".

In the second illustrative embodiment, the IC tag I/F 20 includes the interface memory 21 whose contents cannot be changed by the CPU 32 and the IC tag I/F 20 is not connected to the bus. Nevertheless, in the second illustrative embodiment, for example, the IC tag I/F 20 may include the interface memory 21 whose contents can be changed by the CPU 32. In this case, the IC tag I/F 20 may be connected to the bus. In this variation, the CPU 32 may execute the processing of steps S4, S6, and S8 in FIG. 2. Generally speaking, the state information transmission portion included in a controller may be configured to transmit state information to the communication terminal using a particular wireless network via the second interface.

In the above-described illustrative embodiments, in step S24 in FIG. 3, the CPU 32 of the MFP 10 transmits, to the target terminal, the function related information including both the information indicating whether the printing function is available to the user (e.g., "OK" or "NG") and the information indicating whether the scanning function is available to the user (e.g., "OK" or "NG"), which are associated with the valid authentication information (e.g., the valid user ID and password), with reference to the SFL table 40 (see FIG. 1). Nevertheless, in other embodiments, for example, in step S24 in FIG. 3, of the function related information associated with the valid authentication information (e.g., the valid user ID and password), the CPU 32 of the MFP 10 may transmit, to the target terminal, information indicating that the particular function is available to the user (e.g., the available particular function) (hereinafter, referred to as "limited information") only. Upon receipt of the limited information, the CPU of the target terminal (e.g., the CPU 92 of the mobile terminal PT1) may display an entry screen including the information indicating the particular function that is available based on the limited information to prompt the user to provide an execution instruction (e.g., step S70 in FIG. 4). The limited information may be another example of the "function related information".

In the above-described illustrative embodiments, when the CPU 32 of the MFP 10 receives an execution request from the target terminal (e.g., the mobile terminal PT1) after transmitting the function related information in step S24 in FIG. 3 (e.g., YES in step S26), in step S28, the CPU 32 of the MFP 10 also determines whether the particular function designated by the execution request is available to the user. Although the determination is executed, when the CPU 32 of the MFP 10 receives the execution request from the target terminal (e.g., the mobile terminal PT1) (e.g., YES in step S26) after transmitting the function related information in step S24, there may be a higher possibility that the particular function designated by the execution request is available to the user. In this case, therefore, the CPU 32 may skip the determination in step S28. Generally speaking, when it is determined, through the particular determination, that the particular authentication information is listed on the list and the particular function related information indicates that the execution of the particular function is permitted, the function control portion may be configured to allow the function execution portion to execute the particular function.

In the above-described illustrative embodiments, the authentication information includes both the user ID and the password. Nevertheless, in other embodiments, for example, the authentication information may include the user ID only. In this case, the CPU 32 of the MFP 10 may execute authentication by determining whether the user ID received from the target terminal is included in the SFL table 40 in step S18 in FIG. 3. The user ID may be another example of the "particular authentication information" and the "authentication information".

In the above-described illustrative embodiments, when the authentication is successful (e.g., YES in step S18 in FIG. 3), the CPU 32 of the MFP 10 transmits an OK signal to the target terminal (e.g., step S20). Nevertheless, in other embodiments, for example, when the authentication is successful (e.g., YES in step S18 in FIG. 3), the CPU 32 may transmit function related information to the target terminal instead of the OK signal. When the execution instruction has already been provided by the user, the CPU of the target terminal (e.g., the CPU 92) may be configured to transmit an execution request to the MFP 10 when it is determined that the particular function designated by the execution instruction is available to the user through the determination. When the execution instruction has not yet been provided by the user, similar to the above-described illustrative embodiments, the CPU of the target terminal may display the entry screen including only the particular function that is available to the user. Generally speaking, when it is determined that the particular authentication information is listed on the list through the particular determination, the function execution portion may allow the function execution portion to execute the particular function.

In the above-described illustrative embodiments, the application startup instruction is stored in the IC tag I/F 20 of the MFP 10. Nevertheless, in other embodiments, for example, the IC tag I/F 20 may not necessarily store the application startup instruction therein. Generally speaking, the first device side interface (or the first interface) may be configured to transmit network information to the communication terminal.

In other embodiments, for example, it may be unnecessary to store the SFL table 40 in the memory 34 of the MFP 10. In this case, another device that is communicably connected to the MFP 10 may store an SFL table. That is, another device that is communicably connected to the MFP 10 may store an SFL table therein. In this case, upon receipt of SFL authentication information from the target terminal (e.g., YES in step S16 in FIG. 3), the CPU 32 of MFP 10 may transmit the received SFL authentication information to the other device. A CPU of the other device may execute authentication and transmit an authentication result (e.g., succession or failure of the authentication) to the MFP 10. Generally speaking, when particular authentication information is received from the communication terminal, the first determination portion may be configured to execute the particular determination of whether the particular authentication information is listed on the list.

In the case where the SFL table is stored in the other device, the target terminal may be configured to be allowed to login, in advance, the other device that stores the SFL table therein. That is, it may be configured to enable the other device to execute the authentication using the authentication information in advance. In this case, upon receipt of the authentication information from the target terminal (e.g., YES in step S16 in FIG. 3), the CPU 32 of the MFP 10 may transmit the received authentication information to the other device. The CPU of the other device may transmit the authentication result (e.g., succession or failure of the authentication) to the MFP 10.

The CPU of the target terminal (e.g., the CPU 92 of the mobile terminal PT1) might not necessarily receive the SFL setting information from the MFP 10 in step S50 in FIG. 4 in the first illustrative embodiment nor in step S59 in FIG. 4 in the second illustrative embodiment. The CPU 92 may be configured to transmit authentication information to the MFP 10 regardless of whether the SFL of the MFP 10 is "ON" after a belonging situation is established. In this case, the IC tag I/F 20 of the MFP 10 might not necessarily transmit any SFL setting information to the target terminal in the first illustrative embodiment, and the CPU 32 of the MFP 10 might not necessarily transmit any SFL setting information to the target terminal in the second illustrative embodiment. Generally speaking, when a belonging situation is established, the authentication-information transmission portion may be configured to transmit particular authentication information to the function execution device using the particular wireless network via the second terminal side interface (or the second interface).

In the above-described illustrative embodiments, when it is determined that the SFL of the MFP 10 is "ON" (e.g., YES in step S50 in FIG. 4), the CPU of the target terminal (e.g., the CPU 92 of the mobile terminal PT1) may transmit the authentication information stored in the memory of the target terminal (e.g., the memory 94 of the mobile terminal PT1), to the MFP 10 automatically (e.g., step S52). Nevertheless, in other embodiments, for example, when it is determined that the SFL of the MFP 10 is "ON" (e.g., YES in step S50 in FIG. 4), the CPU 92 may display an entry screen prompting the user to enter the authentication information (e.g., the user ID and the password) on the display unit 74. When the authentication information is entered by the user, the CPU 92 may transmit the entered authentication information to the MFP 10. Generally speaking, when a belonging situation is established, the authentication-information transmission portion may transmit particular authentication information to the function execution device using the particular wireless network via the second terminal side interface (or the second interface).

The SFL table 40 may include a plurality of pieces of combined information in which only the user ID (e.g., "U1") and the password (e.g., "P1") are associated with each other. That is, the SFL table 40 might not necessarily include the availability information for printing function (e.g., "OK" or "NG") that indicates whether the printing function is available to the user, the availability information for scanning function (e.g., "OK" or "NG") that indicates whether the scanning function is available to the user, and the availability information for H/O (e.g., "OK" or "NG") that indicates whether the user is allowed to perform a handover. In this case, when the authentication using the SFL authentication information received from the target terminal is successful (e.g., YES in step S18 in FIG. 3), the CPU 32 of the MFP 10 may execute the requested function without determining whether the requested function is available to the user.

In other embodiments, for example, the MFP 10 may include a touch panel having functions of both the operation unit 12 and the display unit 14. Likewise, the mobile terminal PT1 may include a touch panel having functions of both the operation unit 72 and the display unit 74. That is, the operation unit 12 and the display unit 14 of the MFP 10 (or the operation unit 72 and the display unit 74 of the mobile terminal PT1) may consist of a single hardware.

The "function execution device" is not limited to a multifunction device that is configured to perform the printing function and the scanning function (e.g., the MFP 10). In other embodiments, for example, the "function execution device" may be a printer that may be configured to perform the printing function only or a scanner that may be configured to perform the scanning function only. The "function execution device" may be a device (e.g., a PC, a server, a mobile terminal (e.g., a mobile phone, a smartphone, and a PDA)) that may be configured to perform one or more functions (e.g., an image displaying function or a data calculating function) other than the printing function and the scanning function. That is, the "function execution device" may include any device that may be capable of performing communication using the NFC communication protocol and wireless LAN communication. The "communication terminal" is also not limited to the mobile terminals PT1, PT2, and PT3, but may include any device that may be capable of performing short-range communication (e.g., communication using the NFC communication protocol) and wireless LAN communication.

In the above-described illustrative embodiments, the processing in all steps depicted in FIGS. 2, 3, and 4 is implemented by software (e.g., the program). Nevertheless, in other embodiments, for example, the processing in at least one of the steps depicted in FIGS. 2, 3, and 4 is implemented by hardware, for example, a logical circuit.

Further, the technical elements described in the specification and the drawings exhibit technical usability alone or in various combinations, and are not limited to those in the claims at the time of the application of the disclosure. Furthermore, the techniques described as examples in the specification or drawings may achieve a plurality of objects simultaneously, and has technical utility by achieving any one of these objects.

What is claimed is:

1. A function execution device comprising:
    a first interface configured to perform, with a communication terminal, wireless communication according to an NFC method, the first interface configured to transmit network information to the communication terminal;
    a second interface configured to perform wireless communication using a wireless network in which the function execution device operates as a parent station;
    an operation unit;
    a processor; and
    a memory storing computer-readable instructions therein, the computer-readable instructions, when executed by the processor, causing the function execution device to perform:
        receiving, via the operation unit, an instruction whether the function execution device performs a determination using authentication information, which comprises user identification information, transmitted from the communication terminal, wherein in the function execution device, a plurality of authentication information and function related information, which indicates whether the execution of a printing function is allowed for each of the plurality of authentication information, are stored;
        after receiving, via the operation unit, the instruction that the function execution device performs the determination:
            establishing wireless connection via the second interface in a case where the function execution device transmits the network information to the communication terminal via the first interface, the wireless connection being established by the communication terminal using the network information sent via the first interface, the wireless connection allowing the function execution device to execute the wireless communication with the communication terminal using the wireless network;
            receiving, from the communication terminal, specific authentication information by using the wireless network via the second interface in a case where the wireless connection is established;
            in a case where the function execution device determines that the function related information corresponding to the specific authentication information indicates that the printing function is allowed:
                executing the printing function; and
            in a case where the function execution device determines that the function related information corresponding to the specific authentication information indicates that the printing function is not allowed:
                not executing the printing function, and causing disconnection of the wireless connection between the function execution device and the communication terminal via the second interface; and
        after receiving, via the operation unit, the instruction that the function execution device does not perform the determination:
            establishing wireless connection via the second interface in a case where the function execution device transmits the network information to the communication terminal via the first interface, the wireless connection being established by the communication terminal using the network information sent via the first interface, the wireless connection allowing the function execution device to execute the wireless communication with the communication terminal using the wireless network; and
            executing, in a case where the wireless connection is established, the printing function without receiving, from the communication terminal, the user identification information and without executing the determination.

2. The function execution device according to claim 1, wherein the computer-readable instructions, when executed by the processor, cause the function execution device to further perform:
    transmitting a predetermined signal to the communication terminal via the second interface in a case where the instructions to execute the determination using the authentication information transmitted from the communication terminal has been received,
    wherein the specific authentication information is transmitted from the communication terminal in a case where the predetermined signal is transmitted to the communication terminal.

3. The function execution device according to claim 1, wherein the network information includes a service set identifier.

4. The function execution device according to claim 1, wherein the parent station is a group owner.

5. The function execution device according to claim 1, wherein the authentication information further includes a password.

* * * * *